(12) United States Patent
Tubbs et al.

(10) Patent No.: US 11,548,613 B2
(45) Date of Patent: Jan. 10, 2023

(54) AIR GRILLE PANEL ASSEMBLY, SYSTEM, AND METHOD OF INSTALLING THE SAME IN A VEHICLE

(71) Applicant: The Boeing Company, Chicago, IL (US)

(72) Inventors: Gregory A. Tubbs, Marysville, WA (US); Phillip E. Pacini, Bothell, WA (US)

(73) Assignee: The Boeing Company, Chicago, IL (US)

( * ) Notice: Subject to any disclaimer, the term of this patent is extended or adjusted under 35 U.S.C. 154(b) by 607 days.

(21) Appl. No.: 16/455,724

(22) Filed: Jun. 27, 2019

(65) Prior Publication Data

US 2020/0407038 A1    Dec. 31, 2020

(51) Int. Cl.
*B64C 1/18* (2006.01)
*B64D 13/06* (2006.01)
*B64C 1/00* (2006.01)

(52) U.S. Cl.
CPC .............. *B64C 1/18* (2013.01); *B64D 13/06* (2013.01); *B64C 2001/009* (2013.01)

(58) Field of Classification Search
CPC ......... B64F 5/10; B32B 3/06; B60H 1/00507; B60H 1/248; B60H 1/26; B64C 1/00; B64C 1/066; B64C 1/069; B64C 1/18; B64C 1/403; B64C 2001/0072; B64C 2001/009; B64D 13/02; B64D 13/04; B64D 13/06; F16B 5/0626; F16B 21/09

(Continued)

(56) References Cited

U.S. PATENT DOCUMENTS 2,925,050 A * 2/1960 Candlin, Jr. ........... B61D 17/12
                                                   244/119
4,266,386 A * 5/1981 Bains .................... F16B 5/0036
                                                   52/481.2

(Continued)

OTHER PUBLICATIONS

Japanese Patent Office Notification of Reasons for Rejection Office Action (English Version and Japanese Version), dated Aug. 25, 2020, for related Japanese Design Application No. 2019-027242, Applicant The Boeing Company, and including citation to Boeing 787-8 Dreamliner photograph of panel, photograph added Feb. 16, 2012, 8 total pages.

(Continued)

*Primary Examiner* — Edelmira Bosques
*Assistant Examiner* — Michael James Giordano

(57) ABSTRACT

There is provided an air grille panel assembly for a vehicle. The assembly includes an air grille panel having air grille openings, a top end, and a bottom end. The top end is configured for coupling to a sidewall panel in a cabin of the vehicle. The bottom end is configured for coupling to a raceway assembly on a floor in the cabin. The assembly further includes a frame member disposed around a perimeter of each of the air grille openings, to define each of the air grille openings, an air grille coupled to the frame member and covering each of the air grille openings, and a cover member releasably attached to the air grille. The assembly is configured for coupling to the sidewall panel, via a float attachment, that allows for a vertical adjustment, to accommodate different installed positions of the assembly in the cabin of the vehicle.

28 Claims, 16 Drawing Sheets

(58) Field of Classification Search
USPC .................................................. 454/71, 76
See application file for complete search history.

(56) References Cited

U.S. PATENT DOCUMENTS

| | | | |
|---|---|---|---|
| RE32,554 E | | 12/1987 | Murphy |
| 5,137,231 A | | 8/1992 | Boss |
| 6,129,312 A | * | 10/2000 | Weber ...................... B64C 1/18 |
| | | | 244/129.4 |
| 6,546,673 B2 | | 4/2003 | Aquino |
| 9,499,251 B2 | | 11/2016 | Perkins et al. |
| 9,751,609 B2 | | 9/2017 | Perkins et al. |
| 9,796,245 B2 | | 10/2017 | Switzer et al. |
| 2002/0144835 A1 | * | 10/2002 | Samhammer ........ H02G 3/0487 |
| | | | 174/72 A |
| 2013/0139374 A1 | * | 6/2013 | Eilken ................. F16B 5/0628 |
| | | | 403/53 |
| 2013/0320140 A1 | * | 12/2013 | Cheung .................. B64C 1/066 |
| | | | 244/119 |
| 2014/0325824 A1 | * | 11/2014 | Pacini .................... B64C 1/066 |
| | | | 403/11 |
| 2016/0288896 A1 | * | 10/2016 | Aske ......................... B64F 5/00 |
| 2017/0129581 A1 | * | 5/2017 | Perkins .................. B64C 1/066 |
| 2017/0303402 A1 | * | 10/2017 | Macaraeg ............. B32B 27/065 |
| 2017/0349261 A1 | | 12/2017 | Brown et al. |
| 2017/0349262 A1 | | 12/2017 | Brown et al. |

OTHER PUBLICATIONS

Japanese Patent Office Notification of Reasons for Rejection Final Office Action (English Version and Japanese Version), dated Mar. 9, 2021, for related Japanese Design Application No. 2019-027242, Applicant The Boeing Company, 4 total pages.

* cited by examiner

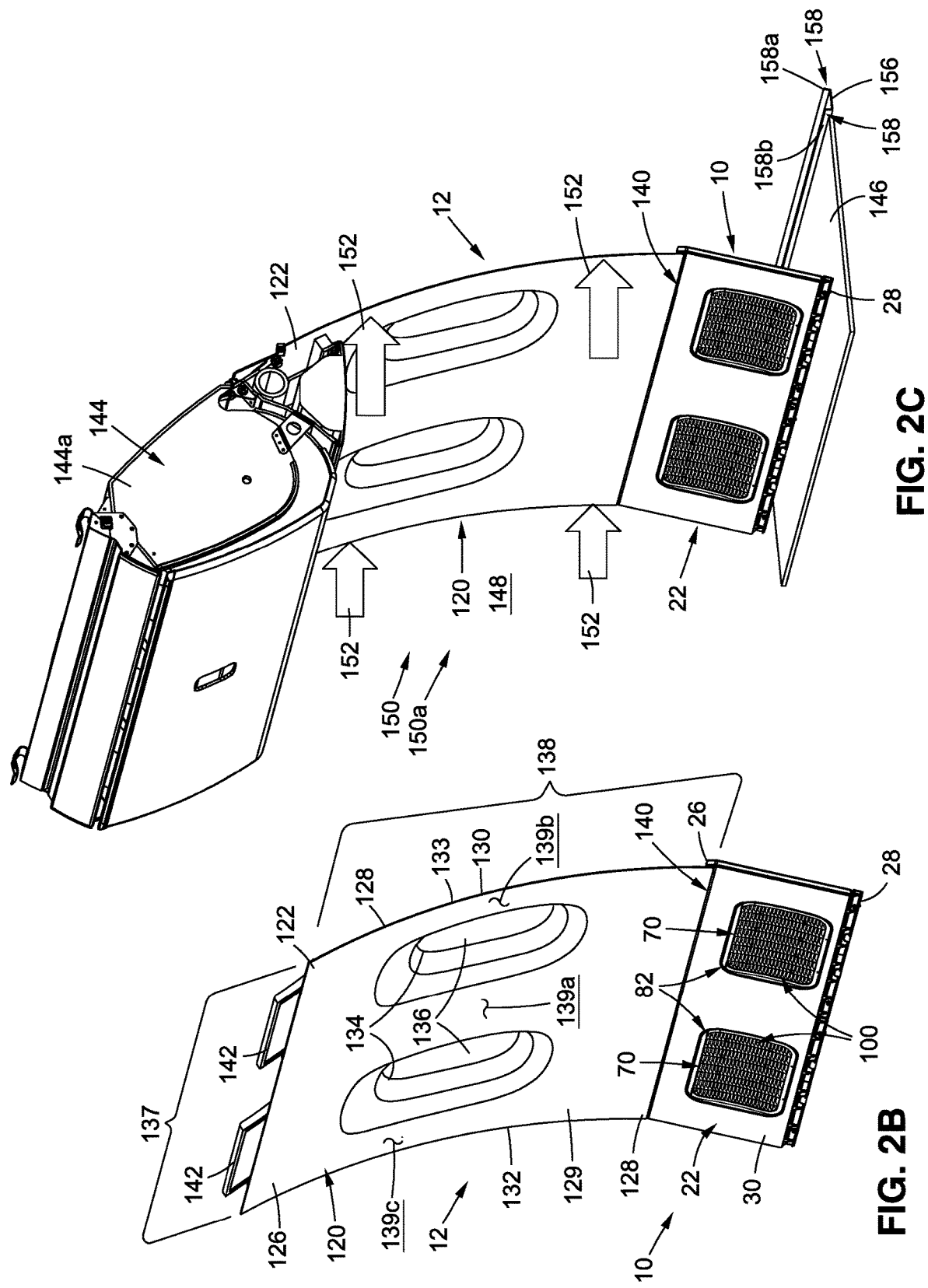

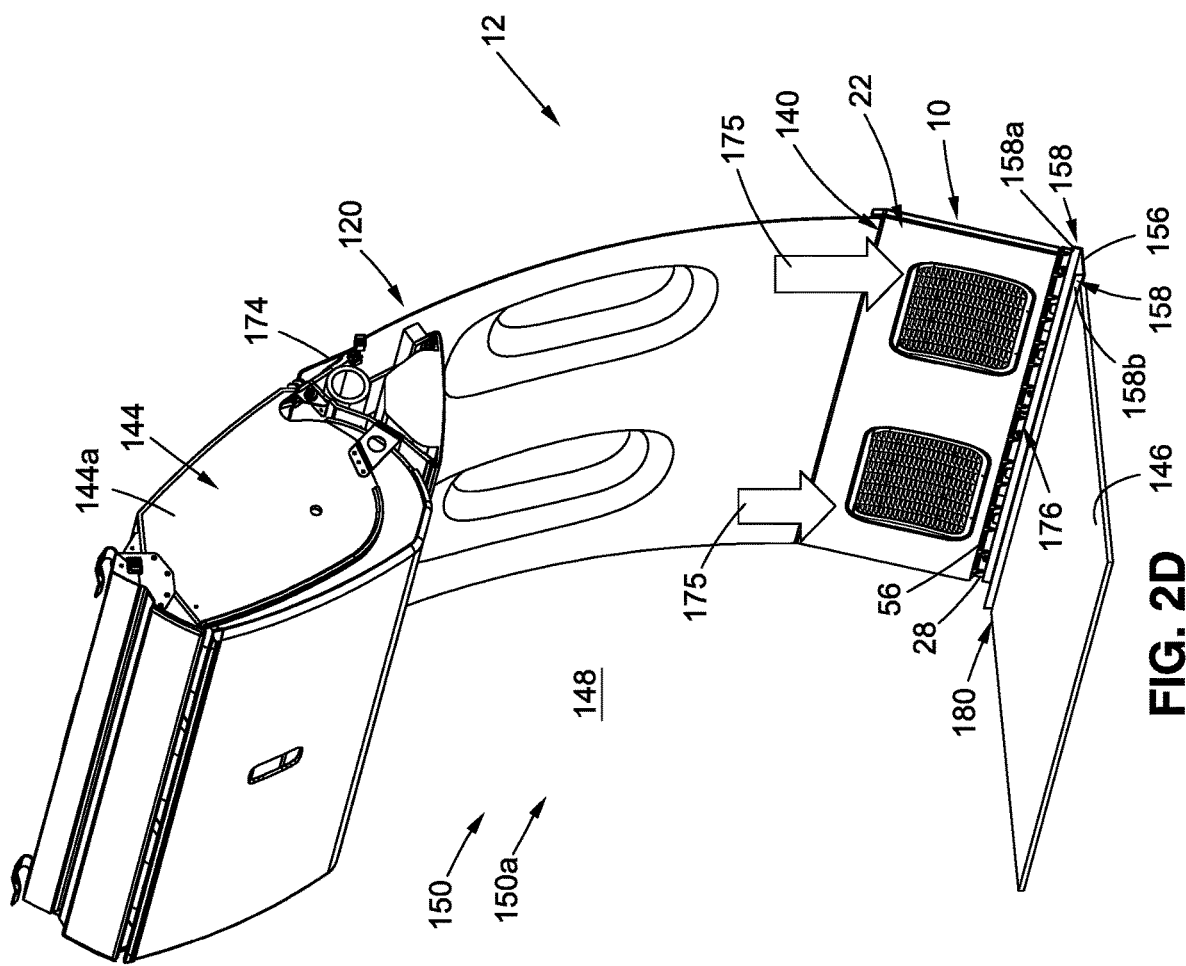

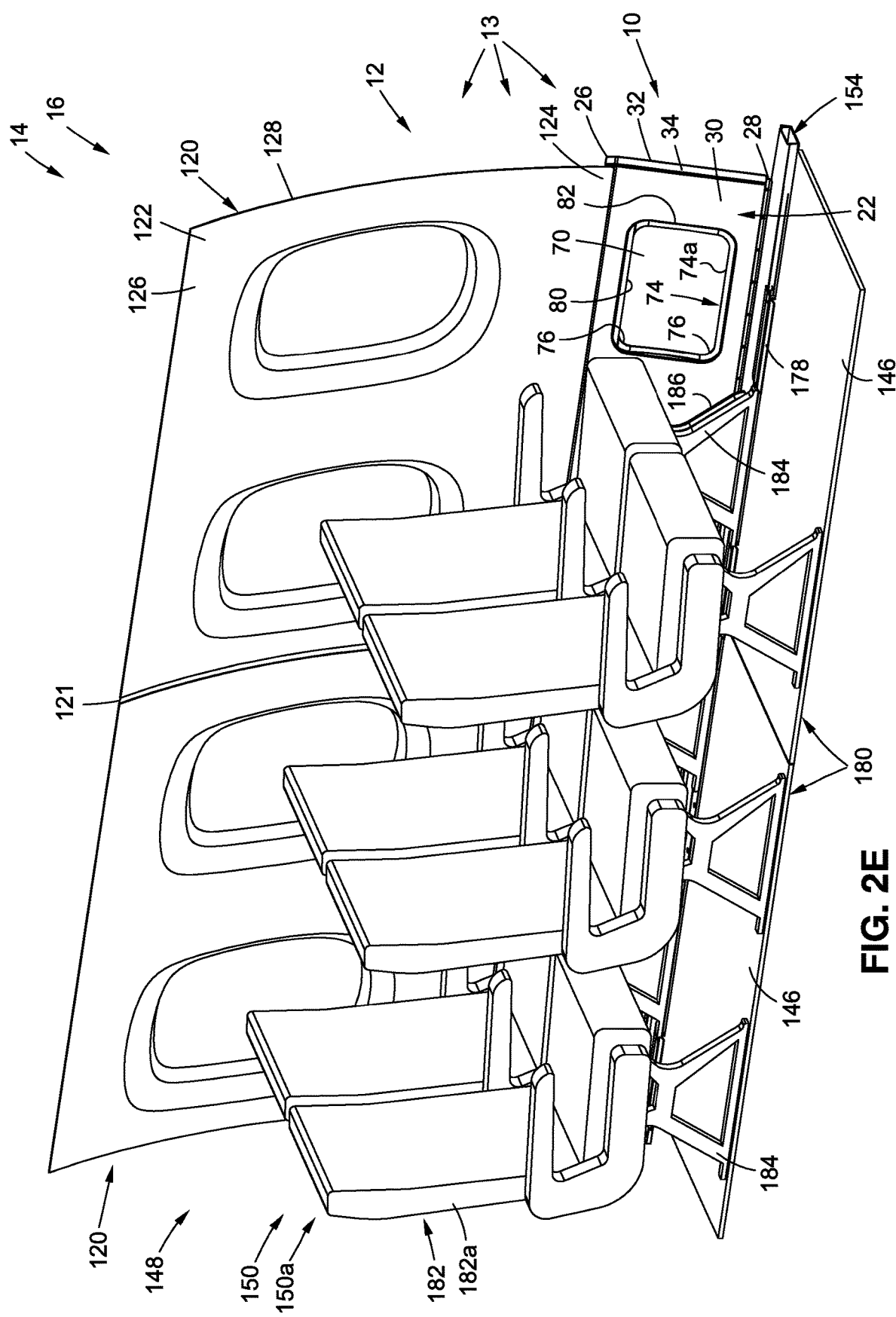

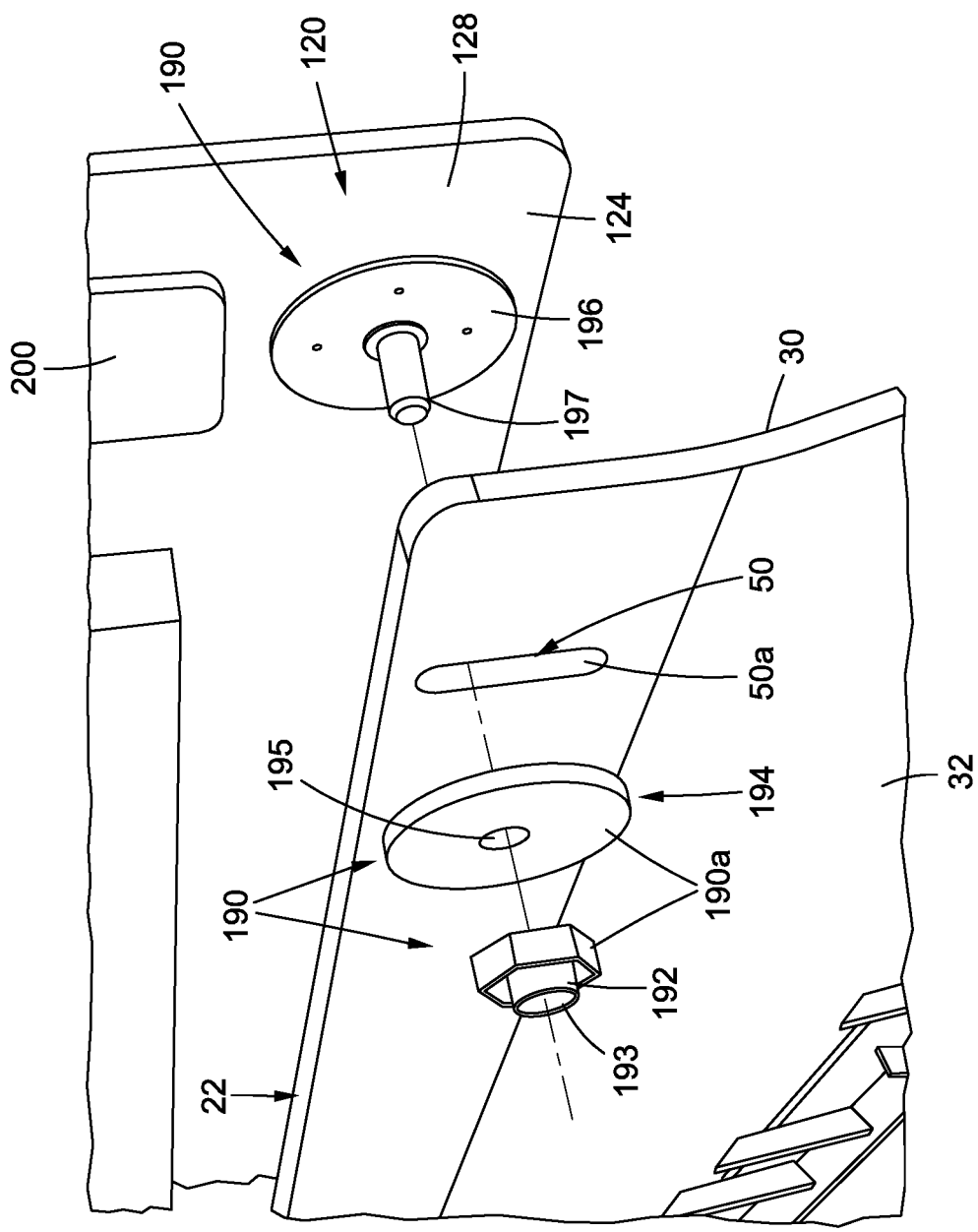

AIR GRILLE PANEL ASSEMBLY, SYSTEM, AND METHOD OF INSTALLING THE SAME IN A VEHICLE

CROSS REFERENCE TO RELATED APPLICATION

This nonprovisional patent application is related to U.S. non-provisional design patent application Ser. No. 29/694,695, titled AIR GRILLE PANEL, filed on Jun. 12, 2019, the contents of which are hereby incorporated by reference in its entirety.

FIELD

The disclosure relates generally to sidewall panel assemblies, systems, and methods for vehicles, and more particularly, to air grille panel assemblies, systems, and methods of installing the same in vehicles, such as aircraft.

BACKGROUND

Vehicles, such as aircraft, for example, commercial aircraft, have sidewall panels located in an interior of a passenger cabin. Such sidewall panels are designed to cover an aircraft frame and walls, as well as to cover aircraft insulation, ducting, and conductive elements, such as electrical runs, for example, wiring and cables, and systems transport elements, for example, air lines and water lines, which are located along the length of the passenger cabin. Such sidewall panels may include air grille panels having air grilles for controlling return air flow and rapid decompression air flow in the aircraft. These air grilles are typically located in the cabin sidewall near the floor between the lower edge of each sidewall panel and the top of the floor. Such air grilles further function as decorative screens and typically have backing baffles to minimize noise transmission into the passenger cabin.

Known sidewall panel assemblies with air grille panels and air grilles exist. However, such sidewall panel assemblies may include full length sidewall panels with the air grilles that tie frame attachments to a floor tolerancing, and may be difficult and time consuming to install in a vehicle, such as an aircraft. Moreover, such full length sidewall panels with the air grilles may be difficult to repair and replace after they have been installed, and may not be of a standard size for variable use. This may result in increased installation, repair, and replacement time and expense.

In addition, known sidewall panel assemblies with a separate air grille panel that attaches to a sidewall panel exist. However, the attachment mechanisms for attaching the separate air grille panel to the sidewall panel may include numerous mechanical parts and/or complex mechanical parts. This may result in increased part count in manufacturing, and may result in increased installation, repair, and replacement time and expense.

Accordingly, there is a need in the art for an air grille panel assembly, system, and method of installing the same in a vehicle, such as an aircraft, that provide for easy installation and replacement, that provide for improved installation time and decreased expense by being incorporated with a sidewall panel, that minimize or eliminate variability in design and installation, that minimize part count, and that provide further advantages over known assemblies, systems, and methods.

SUMMARY

Example implementations of the present disclosure provide an air grille panel assembly, system, and method of installing the same in a vehicle, such as an aircraft. As discussed in the below detailed description, versions of the air grille panel assembly, system, and method of installing the same in a vehicle, such as an aircraft, may provide significant advantages over known assemblies, systems, and methods.

In a version of the disclosure, there is provided an air grille panel assembly for a vehicle. The air grille panel assembly comprises an air grille panel comprising a plurality of air grille openings to regulate air flow through the air grille panel. The air grille panel further comprises a top end and a bottom end. The top end is configured for coupling to a sidewall panel. The sidewall panel is configured for installation in a cabin of the vehicle. The bottom end is configured for coupling to a raceway assembly disposed on a floor in the cabin.

The air grille panel assembly further comprises a frame member disposed around a perimeter of each of the plurality of air grille openings, to define each of the plurality of air grille openings. The air grille panel assembly further comprises an air grille coupled to the frame member and covering each of the plurality of air grille openings. The air grille panel assembly further comprises a cover member releasably attached to a back side of the air grille and configured to move between a closed position and an open position. The air grill panel assembly is configured for coupling to the sidewall panel, via a float attachment, that allows for a vertical adjustment, to accommodate different installed positions of the air grille panel assembly in the cabin of the vehicle.

In another version of the disclosure, there is provided an air grille sidewall panel assembly for a vehicle. The air grille sidewall panel assembly comprises a sidewall panel comprising a top end portion and a bottom end portion. The sidewall panel has a unitary configuration.

The air grille sidewall panel assembly further comprises an air grille panel assembly coupled to the sidewall panel. The air grille panel assembly comprises an air grille panel comprising a plurality of air grille openings to regulate air flow through the air grille panel. The air grille panel further comprises a top end with a top end attachment portion having a plurality of vertical slot openings, and a bottom end configured for coupling to a raceway assembly disposed on a floor in a cabin of the vehicle.

The air grille panel assembly further comprises a frame member having curved corners and extending around a perimeter of each of the plurality of air grille openings, to define each of the plurality of air grille openings. The air grille panel assembly further comprises an air grille coupled to the frame member and covering each of the plurality of air grille openings. The air grille panel assembly further comprises a cover member releasably attached to a back side of the air grille and configured to move between a closed position and an open position.

The air grille sidewall panel assembly further comprises an interface attachment assembly coupling the top end attachment portion of the air grille panel, in a float attachment, to the bottom end portion of the sidewall panel. The float attachment of the sidewall panel to the air grill panel assembly allows for a vertical adjustment, to accommodate different installed positions of the air grille sidewall panel assembly in the cabin of the vehicle.

In another version of the disclosure, there is provided an aircraft. The aircraft comprises a sidewall system in a cabin of the aircraft. The sidewall system comprises an air grille sidewall panel assembly. The air grille sidewall panel assembly comprises a sidewall panel comprising a top end portion and a bottom end portion. The sidewall panel has a unitary configuration.

The air grille sidewall panel assembly further comprises an air grille panel assembly coupled to the sidewall panel. The air grille panel assembly comprises an air grille panel comprising a plurality of air grille openings to regulate air flow through the air grille panel. The air grille panel further comprises a top end with a top end attachment portion having a plurality of vertical slot openings. The air grille panel further comprises a bottom end with a bottom end attachment portion.

The air grille panel assembly further comprises a frame member having curved corners and extending around a perimeter of each of the plurality of air grille openings, to define each of the plurality of air grille openings. The air grille panel assembly further comprises an air grille coupled to the frame member and covering each of the plurality of air grille openings. The air grille panel assembly further comprises a baffle releasably attached to a back side of the air grille and configured to move between a closed position and an open position. The air grille sidewall panel assembly further comprises an interface attachment assembly coupling the top end attachment portion of the air grille panel, in a float attachment, to the bottom end portion of the sidewall panel.

The sidewall system further comprises a raceway assembly comprising a raceway with a first flange member and a second flange member, and a raceway cover removably coupled to the raceway. The raceway assembly is disposed on a floor in the cabin of the aircraft. The sidewall system further comprises a plurality of attachment elements coupling the bottom end attachment portion of the air grille panel, in a removable attachment, to the first flange member of the raceway assembly. The float attachment of the sidewall panel to the air grill panel assembly allows for a vertical adjustment to accommodate different installed positions of the air grille sidewall panel assembly in the cabin of the aircraft.

In another version of the disclosure, there is provided a method of installing an air grille sidewall panel assembly in an aircraft. The method comprises the step of providing an air grille panel assembly. The air grille panel assembly comprises an air grille panel comprising a top end, a bottom end, and a plurality of air grille openings. The top end has a top end attachment portion with a plurality of vertical slot openings.

The air grille panel assembly further comprises a frame member disposed around a perimeter of each of the plurality of air grille openings, to define each of the plurality of air grille openings. The air grille panel assembly further comprises an air grille coupled to the frame member and covering each of the plurality of air grille openings. The air grille panel assembly further comprises a cover member releasably attached to a back side of the air grille and configured to move between a closed position and an open position.

The method further comprises the step of providing a sidewall panel comprising a top end portion and a bottom end portion. The method further comprises the step of coupling, with an interface attachment assembly, the top end of the air grille panel to the bottom end portion of the sidewall panel, to obtain the air grille sidewall panel assembly in a float attachment.

The method further comprises the step of installing the air grille sidewall panel assembly in a cabin of the aircraft, by coupling the top end portion of the sidewall panel to an aircraft structure disposed near a ceiling in the cabin, and coupling the bottom end of the air grille panel to a raceway assembly disposed on a floor in the cabin. The float attachment of the air grille sidewall panel assembly allows for a vertical adjustment to accommodate different installed positions of the air grille sidewall panel assembly in the cabin of the aircraft.

The features, functions, and advantages that have been discussed can be achieved independently in various versions of the disclosure or may be combined in yet other versions further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary versions, but which are not necessarily drawn to scale, wherein:

FIG. 2B is an illustration of a front perspective view of a version of an air grille sidewall panel assembly incorporating the air grille panel assembly of FIG. 2A;

FIG. 2C is an illustration of a front perspective view of the air grille sidewall panel assembly of FIG. 2B in a first installation step;

FIG. 2D is an illustration of a front perspective view of the air grille sidewall panel assembly of FIG. 2C in a second installation step;

FIG. 2E is an illustration of a front perspective view of a version of sidewall system in a cabin of an aircraft, and showing the air grilles removed from the air grille panel assembly;

FIG. 4B is an illustration of an enlarged back perspective view of an interface attachment assembly for an air grille sidewall panel assembly of the disclosure;

The figures shown in this disclosure represent various aspects of the versions presented, and only differences will be discussed in detail.

DETAILED DESCRIPTION

Disclosed versions will now be described more fully hereinafter with reference to the accompanying drawings, in which some, but not all of the disclosed versions are shown. Indeed, several different versions may be provided and should not be construed as limited to the versions set forth herein. Rather, these versions are provided so that this disclosure will be thorough and fully convey the scope of the disclosure to those skilled in the art.

Figure 1A:
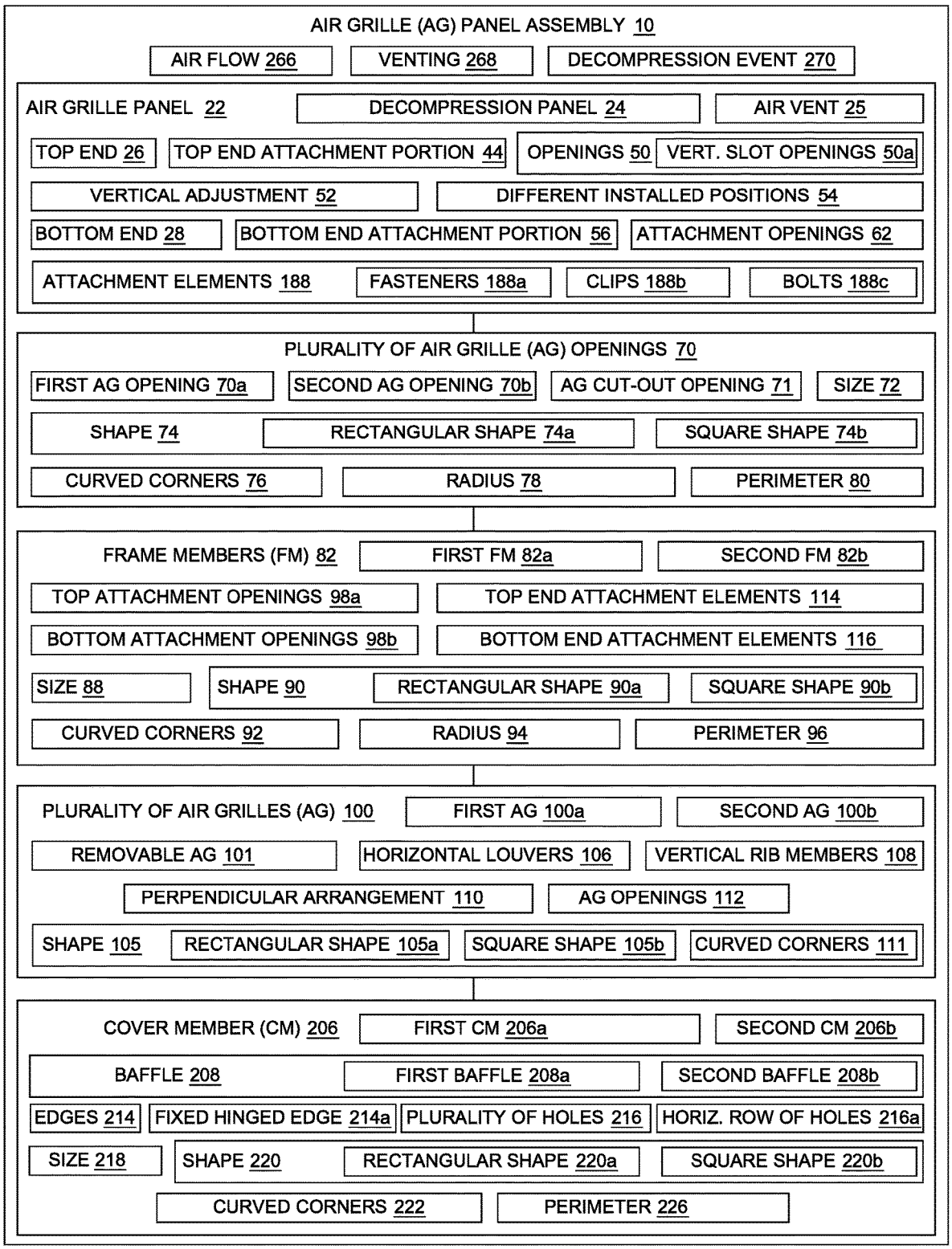
FIG. 1A is an illustration of a functional block diagram showing an exemplary version of an air grille panel assembly of the disclosure.
Figure 1B:
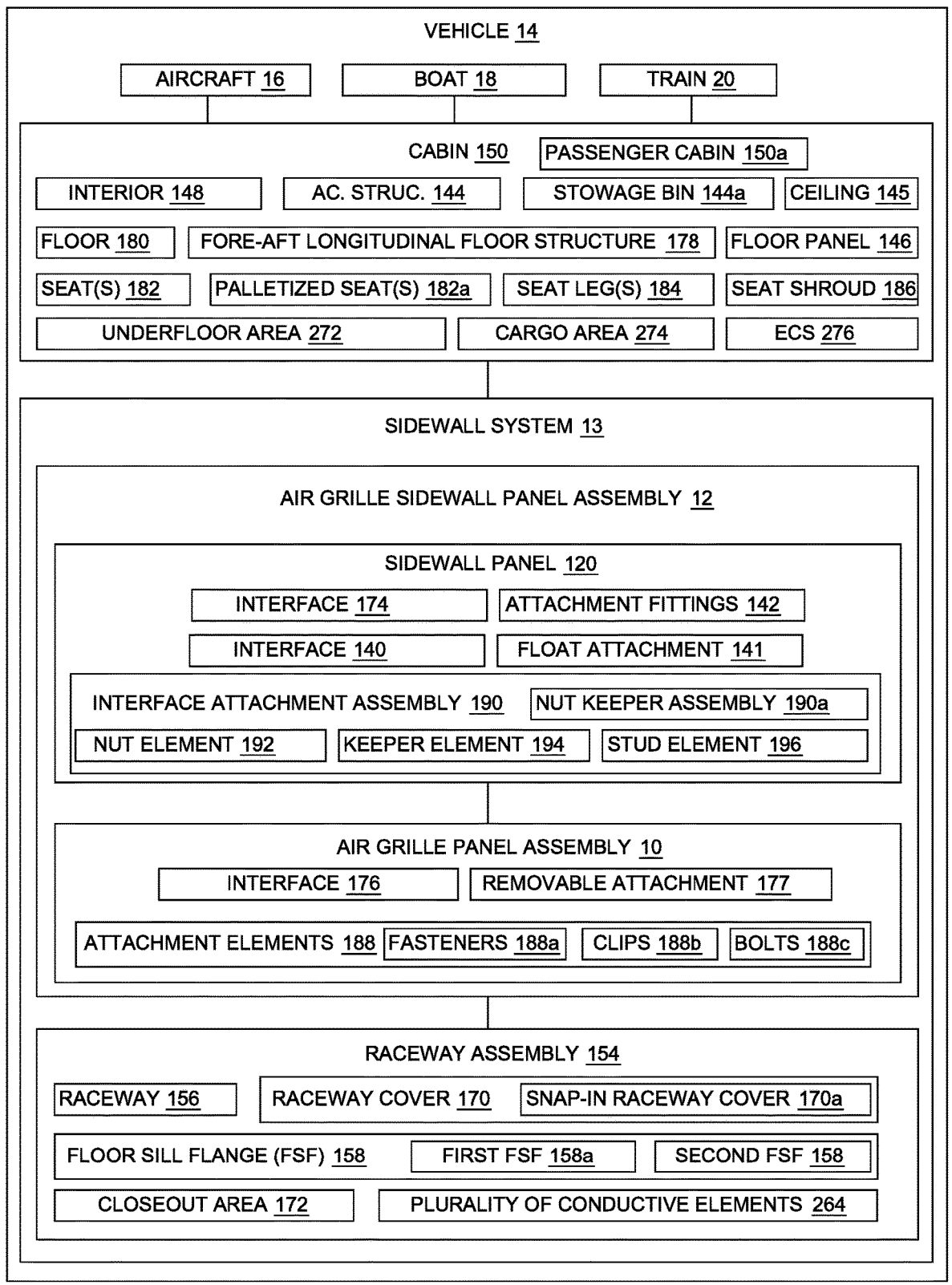
FIG. 1B is an illustration of a functional block diagram showing an exemplary version of a sidewall system with an air grille sidewall panel assembly of the disclosure, for a vehicle.

Now referring to the Figures, FIG. 1A is an illustration of a functional block diagram showing an exemplary version of an air grille panel assembly 10 of the disclosure, and FIG. 1B is an illustration of a functional block diagram showing an exemplary version of a sidewall system 13 with an air grille sidewall panel assembly 12 incorporating the air grille sidewall panel assembly 10 of the disclosure, for a vehicle 14, such as an aircraft 16, a boat 18, a train 20, or another suitable vehicle.

As shown in FIG. 1A, in one version of the disclosure, there is provided an air grille panel assembly 10, for use in a vehicle 14 (see FIG. 1B), such as an aircraft 16 (see FIG. 1B), or other suitable vehicle. As shown in FIG. 1A, the air grille panel assembly 10 provides a path for air flow 266, venting 268 of the air flow 266 from a cabin 150 (see FIG. 1B), such as a passenger cabin 150a (see FIG. 1B), of the vehicle 14, such as the aircraft 16, to an underfloor area 272 (see FIG. 1B), for example, a cargo area 274 (see FIG. 1B), or providing a return of the air flow 266 to an environmental control system (ECS) 276 (see FIG. 1B). As further shown in FIG. 1A, the air grille panel assembly 10 provides the path for air flow 266 to prevent collapse of a floor 180 (see FIG. 1B) of the cabin 150 (see FIG. 1B) during occurrence of a decompression event 270 (see FIG. 1B), and allows for equalization of pressure in the vehicle 14, such as the aircraft 16, during the decompression event 270.

As shown in FIG. 1A, the air grille panel assembly 10 comprises an air grille panel 22. The air grille panel 22 may also be referred to as a decompression panel 24 (see FIG. 1A) or an air vent 25 (see FIG. 1A). The air grille panel 22 may be made of composite materials, such as carbon fiber reinforced plastics, or a composite sandwich panel with a honeycomb core, for example, made with aramid fiber or aluminum honeycomb core, a toughened epoxy resin system, and unidirectional fiberglass or carbon skins. Preferably, the air grille panel 22 is made of a lightweight, high strength-to-weight material.

Figure 2A:
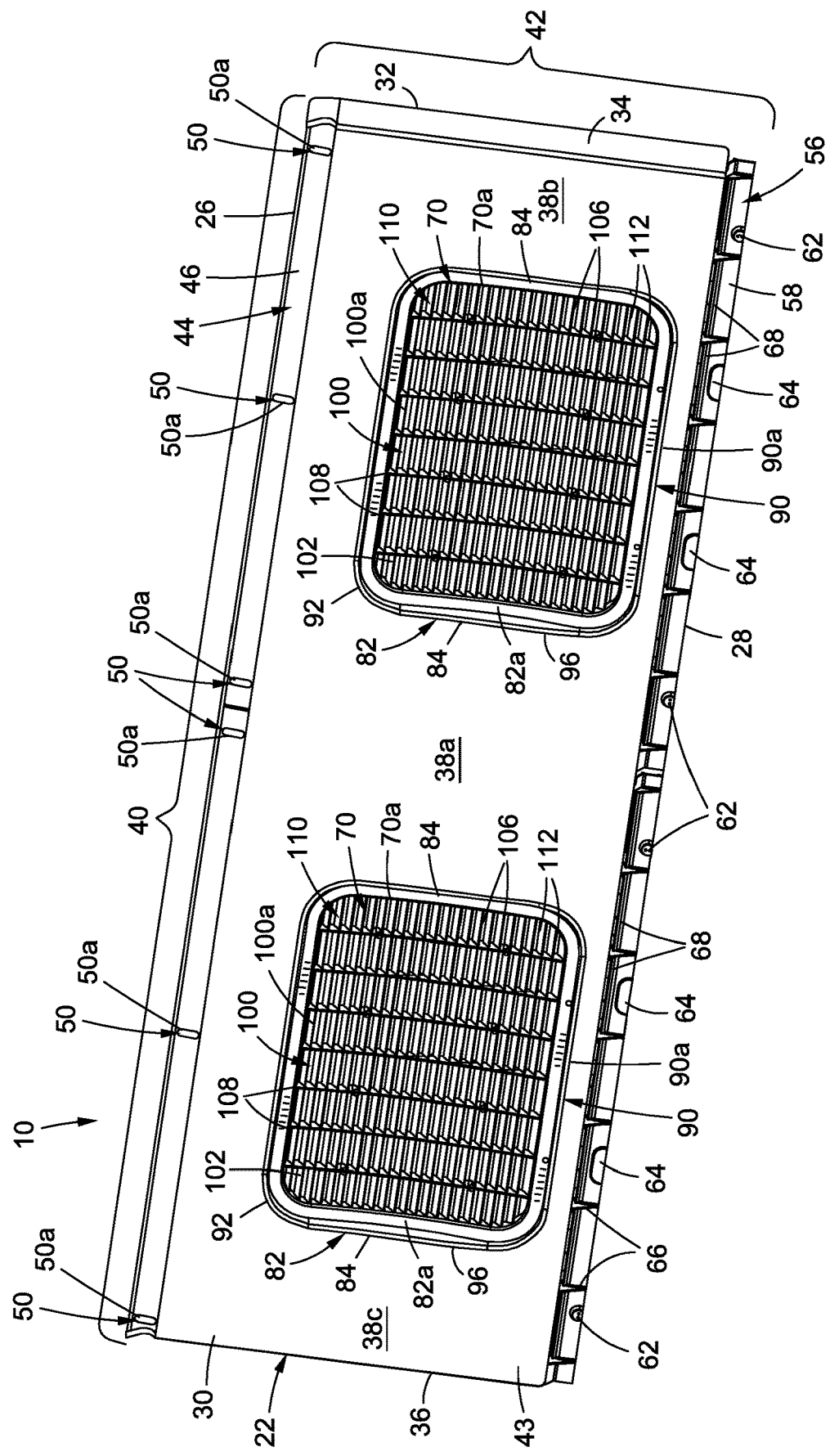
FIG. 2A is an illustration of a front perspective view of a version of an air grille panel assembly of the disclosure.

The air grille panel 22 has a top end 26 (see FIGS. 1A, 2A), a bottom end 28 (see FIGS. 1A, 2A), a front side 30 (see FIG. 2A), a back side 32 (see FIG. 2A), a first edge 34 (see FIG. 2A), and a second edge 36 (see FIG. 2A). The top end 26 of the air grille panel 22 is configured for coupling, and couples, to a bottom end portion 124 (see FIGS. 2B, 3B) of a sidewall panel 120 (see FIGS. 1B, 2B, 3B), and the sidewall panel 120 is configured for installation, and is installed in, a cabin 150, such as a passenger cabin 150a, of the vehicle 14, such as the aircraft 16, or other suitable vehicle. The bottom end 28 of the air grille panel 22 is configured for coupling, and couples, to a raceway assembly 154 (see FIGS. 1B, 2E) disposed on a floor 180 (see FIGS. 1B, 2E) in the cabin 150, such as the passenger cabin 150a.

As shown in FIG. 1A, the top end 26 of the air grille panel 22 has a top end attachment portion 44. The top end attachment portion 44 (see FIGS. 1A, 2A) has a plurality of openings 50 (see FIGS. 1A, 2A), such as a plurality of vertical slot openings 50a (see FIGS. 1A, 2A), formed through the top end attachment portion 44 of the air grille panel 22. FIG. 2A shows six (6) openings 50, such as vertical slot openings 50a, formed through the top end attachment portion 44. However, more than six (6), or less than six (6), openings 50, such as vertical slot openings 50a, may be formed through the top end attachment portion 44. Each of the plurality of openings 50, such as the plurality of vertical slot openings 50a, is configured to receive, and receives, a stud element 196 (see FIGS. 1B, 4B) disposed on a back side 128 (see FIGS. 3B, 4B) of the sidewall panel 120 (see FIGS. 1B, 2B, 3B). The top end attachment portion 44 (see FIG. 2A) has a front side 46 (see FIG. 2A) and a back side 48 (see FIG. 2A).

The air grill panel assembly 10 (see FIG. 1A) is configured for coupling, and couples, to the sidewall panel 120 (see FIG. 1B), via a float attachment 141 (see FIG. 1B). The float attachment 141 allows for a vertical adjustment 52 (see FIG. 1A), to accommodate different installed positions 54 (see FIG. 1A) of the air grille panel assembly 10 in the cabin 150 (see FIG. 1B), such as the passenger cabin 150a (see FIG. 1B), of the vehicle 14 (see FIG. 1B), such as the aircraft 16 (see FIG. 1B), or another suitable vehicle.

As further shown in FIG. 1A, the bottom end 28 of the air grille panel 22 has a bottom end 28 with a bottom end attachment portion 56. The bottom end attachment portion 56 (see FIGS. 1A, 2A) has a plurality of attachment openings 62 (see FIGS. 1A, 2A) formed through the bottom end attachment portion 56. FIG. 2A shows four (4) attachment openings 62 formed through the bottom end attachment portion 56. However, more than four (4), or less than four (4), attachment openings 62 may be formed through the bottom end attachment portion 56. Each of the plurality of attachment openings 62 is configured to receive, and receives, an attachment element 188 (see FIGS. 1A, 5A). As shown in FIG. 1A, the attachment elements 188 may comprise fasteners 188a (see also FIG. 5A), clips 188b, bolts 188c, clamps, pins, or other suitable attachment elements.

The bottom end attachment portion 56 (see FIGS. 1A, 2A) further has a plurality of notched openings 64 (see FIG. 2A) formed through the bottom end attachment portion 56, a plurality of fin portions 66 (see FIGS. 2A, 3B) supporting a lower portion of the back side 32 of the air grille panel 22, and has a plurality of air flow passages 68 (see FIG. 2A) formed between the fin portions 66, to allow air flow 266 to flow through the bottom end 28 of the air grille panel 22. The bottom end attachment portion 56 (see FIGS. 1A, 2A) has a front side 58 (see FIG. 2A) and a back side 60 (see FIG. 5A).

As shown in FIG. 1A, the air grille panel assembly 10 further comprises a plurality of air grille (AG) openings 70 (see also FIG. 2E) to regulate air flow 266 through the air grille panel 22. Preferably, the air grille panel 22 comprises two air grille openings 70, such as a first air grille (AG) opening 70a (see FIG. 1A) and a second air grille (AG) opening 70b (see FIG. 1A). Each air grille opening 70 preferably comprises an air grille (AG) cut-out opening 71 (see FIG. 1A) that is cut out through the air grille panel 22. Each of the plurality of air grille openings 70, such as the first air grille opening 70*a* and the second air grille opening 70*b*, has a size 72 (see FIG. 1A) and a shape 74 (see FIG. 1A) that are identical or the same, or substantially identical or the same. As shown in FIG. 1A, the shape 74 of each of the plurality of air grille openings 70 may comprise a rectangular shape 74*a*, a square shape 74*b*, or another suitable shape. Preferably, each of the plurality of air grille openings 70 has a rectangular shape 90*a*. Each of the plurality of air grille openings 70 preferably has curved corners 76 (see also FIG. 2E), or rounded corners, on each of the four (4) corners of the air grille opening 70. Each of the curved corners 76 of each of the air grille openings 70 has a radius 78 (see FIG. 1A) that is equal, or substantially equal, in length. Each of the air grille openings 70 further has a perimeter 80 (see FIGS. 1A, 2E).

As shown in FIG. 1A, the air grille panel assembly 10 further comprises a frame member 82 disposed around the perimeter 80 of each of the plurality of air grille openings 70, to define each of the plurality of air grille openings 70. Preferably, the air grille panel assembly 10 comprises two frame members (FM) 82, such as a first frame member (FM) 82*a* (see FIG. 1A) and a second frame member (FM) 82*b* (see FIG. 1A). Each air grille opening 70 has a corresponding frame member 82 formed around the perimeter 80 of the air grille opening 70. Each frame member 82 has a front side 84 (see FIG. 2A) and a back side 86 (see FIG. 3B).

Each of the frame members 82, such as the first frame member 82*a* and the second frame member 82*b*, has a size 88 (see FIG. 1A) and a shape 90 (see FIG. 1A) that are identical or the same, or substantially identical or the same. As shown in FIG. 1A, the shape 90 of each of the frame members 82 may comprise a rectangular shape 90*a*, a square shape 90*b*, or another suitable shape. Preferably, each of the frame members 82 has a rectangular shape 90*a*. Each of the frame members 82 preferably has curved corners 92 (see also FIGS. 1A, 2A), or rounded corners, on each of the four (4) corners of the frame member 82. Each of the curved corners 92 of each of the frame members 82 has a radius 94 (see FIG. 1A) that is equal, or substantially equal, in length. Each of the frame members 82 further has a perimeter 96 (see FIGS. 1A, 2E).

As shown in FIG. 1A, the air grille panel assembly 10 further comprises an air grille 100 coupled to the frame member 82 and covering each of the plurality of air grille openings 70. Preferably, the air grille panel assembly 10 comprises a plurality of air grilles 100, such as two air grilles 100, for example, a first air grille (AG) 100*a* (see FIG. 1A) and a second air grille (AG) 100*b* (see FIG. 1A).

Each air grille 100 preferably comprises a removable air grille (AG) 101 (see FIG. 1A) that may be easily attached and detached from the air grille panel 22. Each of the frame members 82 has one or more top attachment openings 98*a* (see FIGS. 1A, 3B) and one or more bottom attachment openings 98*b* (see FIGS. 1A, 3B). Each of the one or more top attachment openings 98*a* is configured to receive, and receives, a top end attachment element 114 (see FIGS. 1A, 3B) to retain the air grille 100 (see FIGS. 1A, 3B) to the corresponding frame member 82. Each of the one or more bottom attachment openings 98*b* is configured to receive, and receives, a bottom end attachment element 116 (see FIGS. 1A, 3B) to retain the air grille 100 (see FIGS. 1A, 3B) to the corresponding frame member 82. The top end attachment elements 114 and the bottom end attachment elements 116 may comprise one or more of, fasteners, bolts, screws, clips, pins, or other suitable attachment elements.

Each of the plurality of air grilles 100, such as the first air grille 100*a* and the second air grille 100*b*, has a front side 102 (see FIG. 2A) and a back side 104 (see FIG. 3B), and each air grille 100 has a shape 105 (see FIG. 1A) that is identical or the same, or substantially identical or the same. The shape 105 of each of the plurality of air grilles 100 corresponds, or substantially corresponds, to the shape 74 of the air grille opening 70 and/or the shape 90 of the frame member 82. The shape 105 of each of the plurality of air grilles 100 may comprise a rectangular shape 105*a* (see FIG. 1A), a square shape 105*b* (see FIG. 1A), or another suitable shape. Preferably, each of the plurality of air grilles 100 has a rectangular shape 105*a*. Each of the plurality of air grilles 100 preferably has curved corners 111 (see FIG. 1A), or rounded corners, on each of the four (4) corners of the air grille 100.

Figure 4A:
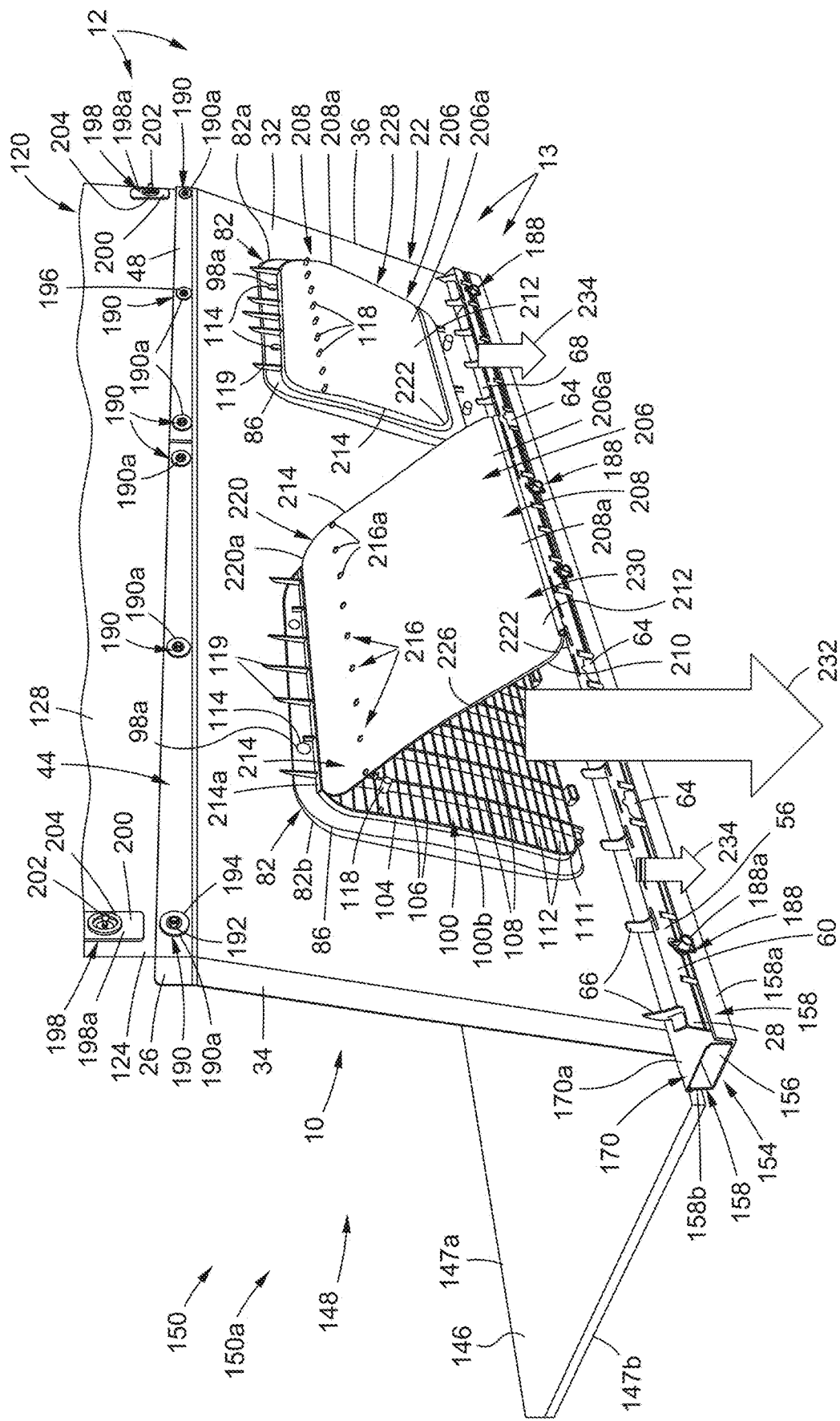
FIG. 4A is an illustration of a back perspective view of a version of a sidewall system, showing cover members attached to air grilles of an air grille panel assembly.

As shown in FIG. 1A, each of the plurality of air grilles 100 comprises a plurality of horizontal louvers 106 oriented in a perpendicular arrangement 110 to a plurality of vertical rib members 108, or vertical stiffener members. The plurality of horizontal louvers 106 and the plurality of vertical rib members 108 intersect with one another to define a grid, and a plurality of air grille openings 112 (see FIG. 1A) are formed between the intersection of the plurality of horizontal louvers 106 and the plurality of vertical rib members 108. As shown in FIG. 4A, each of the plurality of air grilles 100 may further comprise a plurality of headed fasteners 118 (see also FIG. 4A) configured for insertion through, and inserted through, a plurality of holes 216 (see FIGS. 1A, 4A). The plurality of headed fasteners 118 may comprise one or more of, screws, bolts, pins, nuts, washers, or other suitable fasteners or fastener assemblies. As shown in FIG. 4A, each of the plurality of air grilles 100 may further comprise a plurality of attachment projections 119 coupled to, and extending above, the top end of the air grille 100 to assist in retaining the air grille 100 in place over the air grille opening 70.

The air grilles 100 and frame members 82 are preferably made of a plastic or thermoplastic material, such as a rigid and durable plastic or thermoplastic material. The air grilles 100 are designed to allow for return air flow passage without conditioned air migration in the cabin 150, and are also designed to allow for rapid flow of air in a decompression event 270 (see FIG. 1A) where there is a sudden pressure differential. Further, the air grilles 100 preferably block line-of-site noise transmission into the cabin 150, and also function as decorative screens that provide improved aesthetics. Moreover, the air grilles 100 are designed to protect insulation, as well as aircraft systems, located behind the air grilles 100 and the sidewall panel 120, from damage due to cleaning equipment, under-seat passenger luggage, and other passenger wear and tear. The air grilles 100 are also designed to conceal the air grille openings 70 from view.

As shown in FIG. 1A, the air grille panel assembly 10 further comprises a cover member 206 (see also FIG. 4A) releasably attached to the back side 104 (see FIG. 4A) of the air grille 100 and disposed over substantially all of the back side 104 of the air grille 100. Preferably, the air grille panel assembly 10 comprises two cover members 206, such as a first cover member (CM) 206*a* (see FIG. 1A) and a second cover member (CM) 206*b* (see FIG. 1A). Preferably the cover members 206 are in the form of baffles 208 (see FIG. 1A), or backing baffles, such as a first baffle 208*a* (see FIG. 1A) and a second baffle 208*b* (see FIG. 1A).

Each cover member 206, such as in the form of the baffle 208, comprises a first side 210 (see FIG. 2A) facing the back side 104 (see FIG. 4A) of the air grille 100 (see FIG. 4A) and facing inboard, and has a second side 212 (see FIG. 4A) facing outboard. Each cover member 206, such as in the form of the baffle 208, further comprises a plurality of edges 214 (see FIGS. 1A, 4A), such as a top edge, a bottom edge, and two side edges. Preferably, one of the plurality of edges 214 is a fixed hinged edge 214a (see FIGS. 1A, 4A), such as the top edge, that is hingedly fixed to the top end of the air grille 100, and is configured to be releasably attached for movement.

Each cover member 206, such as in the form of the baffle 208, further comprises a plurality of holes 216 (see FIGS. 1A, 4A), such as in the form of a horizontal row of holes 216a (see FIGS. 1A, 4A), that are configured to receive, and receive, the plurality of headed fasteners 118 projecting from the back side 104 of the air grille 100, when the cover member 206, such as the baffle 208, is in a closed position 228 (see FIG. 4A). The plurality of holes 216 (see FIGS. 1A, 4A), such as the horizontal row of holes 216a (see FIGS. 1A, 4A), are configured to fit over a corresponding number of rows of the headed fasteners 118 on the air grille 100 and are configured to removably attach the cover member 206, such as the baffle 208, to the air grille 100 along the horizontal row of holes 216a. When the cover member 206, such as the baffle 208, is in an open position 230 (see FIG. 4A), the cover member 206, such as the baffle 208, is moved, or lifted, away from the air grille 100, and the plurality of headed fasteners 118 detach from the plurality of holes 216. The position and size of the plurality of holes 216 and the headed fasteners 118 are configured so that the headed fasteners 118 protrude through the plurality of holes 216 in the cover member 206, such as the baffle 208, during normal flight operations when the vehicle 14 comprises an aircraft 16, and the cover member 206, such as the baffle 208, at least partially releases from the air grille 100 upon occurrence of a decompression event 270 (see FIG. 1A) that is rapid.

Each cover member 206, such as the baffle 208, is configured to move between the closed position 228 and the open position 230, when air flow 266 moves through the air grille opening 70 and the air grille 100 and/or when there is a decompression event 270 (see FIG. 1A). For example, under pressure, the cover member 206, such as the baffle 208, is blown away from the air grille 100, allowing a specified amount of air to pass between the cabin 150 (see FIG. 1B), such as the passenger cabin 150a (see FIG. 1B), and the underfloor area 272 (see FIG. 1B), such as the cargo area 274 (see FIG. 1B), or lower fuselage, in a given amount of time. The air grille 100 and the cover member 206, such as the baffle 208, are designed to allow air flow 266 (see FIG. 1A) to pass under a specified pressure, but need to be robust enough for passenger wear and tear.

Each cover member 206, such as in the form of a baffle 208, has a size 218 (see FIG. 1A) and a shape 220 (see FIGS. 1A, 4A) that are identical or the same, or substantially identical or the same. As shown in FIG. 1A, the shape 220 of each of the cover member 206, such as the baffle 208, may comprise a rectangular shape 220a, a square shape 220b, or another suitable shape. Preferably, each of the cover members 206, such as the baffles 208, has a rectangular shape 220a (see FIG. 4A). Each of the cover members 206, such as the baffles 208, has curved corners 222 (see FIGS. 1A, 4A), or rounded corners, on each of the four (4) corners of the cover member 206, such as the baffle 208. Each of the cover members 206, such as the baffles 208, further has a perimeter 226 (see FIGS. 1A, 4A). The cover member 206, such as the baffle 208, may be made of a fabric material, such as a canvas material or a blanket material, may be made of a laminate material comprised of a vinyl material, such as film, and aluminum foil, or may be made of another suitable material. Preferably, the cover member 206, such as the baffle 208, is made of a sound attenuating material that provides a barrier to minimize engine and fuselage noise. Preferably, the cover member 206, such as the baffle 208, is made of a flexible material. Each cover member 206, such as the baffle 208, is coupled to the back side 104 of the air grille 100 and is designed to decrease the noise in the cabin 150. Further, each cover member 206, such as the baffle 208, may be easily released away from the back side 104 of the air grille 100 during a decompression event 270 (see FIG. 1A).

Now referring to FIG. 1B, FIG. 1B is an illustration of a functional block diagram showing an exemplary version of a sidewall system 13 with an air grille sidewall panel assembly 12 incorporating the air grille panel assembly 10 of the disclosure, for a vehicle 14, such as an aircraft 16, a boat 18, a train 20, or another suitable vehicle.

In another version of the disclosure, there is provided a vehicle 14, such as an aircraft 16, or other suitable vehicle having a sidewall system 13 (see FIG. 1B) in an interior 148 (see FIG. 1B) of a cabin 150 (see FIG. 1B), such as a passenger cabin 150a (see FIG. 1B), of the vehicle 14, such as the aircraft 16. As shown in FIG. 1B, the cabin 150 includes an aircraft structure 144, such as a stowage bin 144a, located at or near a ceiling 145 of the cabin 150, and includes a floor 180 in the cabin 150. The floor 180 may include fore-aft longitudinal floor structures 178 (see FIG. 1B), for example, seat tracks, raceway layouts, and conduits. The floor 180 also includes one or more floor panels 146 (see FIG. 1B). As shown in FIG. 1B, the cabin 150 further includes seats 182 for passengers, for example, palletized seats 182a, which are reconfigurable and typically have large metallic structures that are bolted to the floor 180. The seats 182 have seat legs 184 (see FIGS. 1B, 2E) and seat shrouds 186 (see FIGS. 1B, 2E) for routing a plurality of conductive elements 264 (see FIG. 1B) from the raceway assembly 154 (see FIG. 1B). An underfloor area 272 (see FIG. 1B), such as a cargo area 274 (see FIG. 1B), may be located below the floor 180 and one or more floor panels 146 of the cabin 150. In addition, an environmental control system (ECS) 276 (see FIG. 1B) is located in the cabin 150 and/or behind the sidewall panels 120 and air grille panel assemblies 10 to receive air flow 266 from the cabin 150 or other areas of the vehicle 14, such as the aircraft 16, returned to the ECS 276. During normal operation of the vehicle 14, such as the aircraft 16, there is provided a return air flow path within the ECS 276 for conditioned air to be circulated within the cabin 150 and cargo area 274.

As shown in FIG. 1B, the sidewall system 13 comprises an air grille sidewall panel assembly 12. The air grille sidewall panel assembly 12 (see FIGS. 1B, 2B) comprises a sidewall panel 120 (see FIGS. 1B, 2B). As shown in FIG. 2B, the sidewall panel 120 comprises a top end portion 122, a bottom end portion 124, a front side 126, a back side 128, a first edge 130, and a second edge 132. As further shown in FIG. 2B, the sidewall panel 120 has a unitary configuration 129 and a curved profile 133. As further shown in FIG. 2B, the sidewall panel 120 has a plurality of window openings 134 formed through the sidewall panel 120, configured to retain, and retaining, a plurality of windows 136. Each window 136 is retained in the window opening 134. As further shown in FIG. 2B, the sidewall panel 120 has a first area 139a located between the window openings 134, a second area 139b located between the first edge 130 and a window opening 134, and a third area 139c located between the second edge 132 and a window opening 134. The sidewall panel 120 has a length 137 (see FIG. 2B) and a height 138 (see FIG. 2B).

As shown in FIG. 1B, the sidewall panel 120 has attachment fittings 142 (see also FIG. 2B) disposed at, or located at, the top end portion 122 of the sidewall panel 120. The attachment fittings 142 are configured to couple, or attach, and couple or attach, the sidewall panel 120 to an aircraft structure 144 (see FIGS. 1B, 2C), such as the stowage bin 144a (see FIGS. 1B, 2C), or other aircraft structure, to form an interface 174 (see FIGS. 1B, 2D) between the sidewall panel 120 and the aircraft structure 144, such as the stowage bin 144a.

As shown in FIG. 1B, the air grille sidewall panel assembly 12 comprises an interface attachment assembly 190 to couple, or attach, the air grille panel assembly 10, in a float attachment 141, to the sidewall panel 120, to form an interface 140 (see also FIG. 2B), and in particular to couple, or attach, the top end attachment portion 44 (see FIGS. 1A, 2A) of the air grille panel 22 (see FIGS. 1A, 2A), in the float attachment 141, to the bottom end portion 124 (see FIG. 2B) of the sidewall panel 120. Each interface attachment assembly 190 comprises a nut keeper assembly 190a (see FIG. 1B) including a nut element 192 (see FIG. 1B) and a keeper element 194 (see FIG. 1B), and comprises a stud element 196 (see FIG. 1B). As shown in FIGS. 4A-4B, each of a plurality of stud elements 196 (see FIG. 4B) is disposed on a back side 128 at the bottom end portion 124 of the sidewall panel 120, and each is inserted through one of each of the plurality of openings 50 (see FIG. 4B), such as the vertical slot openings 50a (see FIG. 4B), and is inserted through one of each of the plurality of nut keeper assemblies 190a, to attach each nut keeper assembly 190a to each stud element 196.

The float attachment 141 (see FIG. 1B) of the sidewall panel 120 to the air grill panel assembly 10, via the interface attachment assemblies 190 (see FIG. 1B), allows for a vertical adjustment 52 (see FIG. 1A), to accommodate different installed positions 54 (see FIG. 1B) of the air grille sidewall panel assembly 12 in the cabin 150, such as the passenger cabin 150a, of the vehicle 14, such as the aircraft 16.

As shown in FIG. 1B, the air grille sidewall panel assembly 12 of the sidewall system 13 further comprises the air grille panel assembly 10 coupled to the sidewall panel 120. As discussed above, the air grille panel assembly 10 comprises the air grille panel 22 (see FIG. 1A) comprising the plurality of air grille openings 70 (see FIG. 1A) to regulate air flow 266 (see FIG. 1A) through the air grille panel 22. Preferably, the air grille panel 22 comprises two air grille openings 70 (see FIG. 1A), each having a size 72 (see FIG. 1A) and a shape 74 (see FIG. 1A) that are identical or the same, or substantially identical or the same, and each having the frame member 82, the air grille 100, and the cover member 206. The air grille panel 22 further comprises the top end 26 (see FIG. 1A) with the top end attachment portion 44 (see FIG. 1A) having a plurality of openings 50 (see FIG. 1A), such as the plurality of vertical slot openings 50a (see FIG. 1A), and further comprises the bottom end 28 (see FIG. 1A) with the bottom end attachment portion 56 (see FIG. 1A).

As discussed above, the air grille panel assembly 10 further comprises the frame member 82 (see FIG. 1A) having curved corners 92 (see FIG. 1A) and extending around the perimeter 80 (see FIG. 1A) of each of the plurality of air grille openings 70, to define each of the plurality of air grille openings 70. The air grille panel assembly 10 further comprises the air grille 100 (see FIG. 1A) coupled to the frame member 82, and covering each of the plurality of air grille openings 70. The air grille panel assembly 10 further comprises the cover member 206 (see FIG. 1A), such as the baffle 208 (see FIG. 1A), releasably attached to the back side 104 (see FIG. 3B) of the air grille 100 and configured to move between the closed position 228 (see FIG. 4A) and the open position 230 (see FIG. 4A). The bottom end 28 (see FIGS. 1A, 2A) of the air grille panel assembly 10 is configured for coupling, and couples, to a raceway assembly 154 (see FIG. 1B) disposed on a floor 180 in the cabin 150, such as the passenger cabin 150a, of the vehicle 14, such as the aircraft 16.

As shown in FIG. 1B, the air grille panel assembly 10 is configured to couple or attach, and couples or attaches, to the raceway assembly 154, in a removable attachment 177, for example, a fastener clamp-on attachment, with attachment elements 188, to form an interface 176 (see also FIG. 2D) between the air grille panel assembly 10 and the raceway assembly 154. In particular, the bottom end attachment portion 56 (see FIG. 1A) of the air grille panel 22 is configured to couple or attach, and couples or attaches, in a removable attachment 177 (see FIG. 1A), to a flange member 158 (see FIG. 1B), such as a first flange member 158a (see FIG. 1B), of the raceway assembly 154. As shown in FIG. 1B, the attachment elements 188 may comprise one or more of, fasteners 188a, clips 188b, bolts 188c, clamps, pins, or other suitable attachment elements.

As shown in FIG. 1B, the sidewall system 13 further comprises the raceway assembly 154. The raceway assembly 154 comprises a raceway 156 with flange members 158, such as a first flange member 158a and a second flange member 158b, and a raceway cover 170, such as a snap-in raceway cover 170a, removably coupled to the raceway 156. The flange member 158, for example, the first flange member 158a, preferably comprises a floor sill flange 159 (see FIG. 1B). A closeout area 172 (see FIG. 1B) is formed between the raceway cover 170 and the raceway 156, when the raceway cover 170 is removably coupled, or attached, to the raceway 156. The closeout area 172 of the raceway assembly 154 is configured to retain and route a plurality of conductive elements 264 (see FIG. 1B) through the cabin 150, such as the passenger cabin 150a, and to the seats 182 (see FIG. 1B), to the underfloor area 272 (see FIG. 1B), and to other areas inside or outside the cabin 150. The plurality of conductive elements 264 may comprise wires; cables including electrical cables, data bus cables, high speed transmission cables, coaxial cables, fiber optic cables; printed circuit boards; tubes; capacitors; electrical runs including power runs, data runs, lighting system runs, seat system runs, in-flight entertainment (IFE) system runs, seat actuation runs, and personal electronic device (PED) runs; systems transport elements including pneumatic lines, air lines, fluid lines, water lines, or other suitable conductive elements. The raceway 156 may be made of a composite material or a metal material. The raceway cover 170 may be made of a soft plastic material.

The air grille panel 22 of the air grille panel assembly 10 is mechanically fastened to the sidewall panel 120, and the float attachment 141 allows vertical movement up and down, to allow the air grille panel 22 to engage the flange member 158, such as the first flange member 158a, of the raceway assembly 154, taking up any vertical tolerance. Because the air grille panel assembly 10 is coupled to, or attached to, and incorporated and integrated with the sidewall panel 120, to form the air grille sidewall panel assembly 12, the time for installation and/or replacement in the vehicle, such as the aircraft 16, or other vehicle, is reduced and improved, as compared to known sidewall assemblies and systems that do not have separate air grille panels and sidewall panels. In addition, the use of air grille panels 22 and sidewall panels 120 made of composite materials reduces the weight and increases the strength of the air grille sidewall panel assembly 12.

Now referring to FIG. 2A, FIG. 2A is an illustration of a front perspective view of a version of the air grille panel assembly 10 of the disclosure. As shown in FIG. 2A, the air grille panel assembly 10 comprises the air grille panel 22 having the top end 26, the bottom end 28, the front side 30, the back side 32, the first edge 34, and the second edge 36. As further shown in FIG. 2A, the air grille panel 22 has a first area 38*a* located between the air grilles 100, such as the first air grille 100*a* and the second air grille 100*b*, has a second area 38*b* located between the first edge 34 and the second air grille 100*b*, and has a third area 38*c* located between the second edge 36 and the first air grille 100*a*. As shown in FIG. 2A, the width of the second area 38*b* and the width of the third area 38*c* are the same, or substantially the same, and the width of the first area 38*a* is greater than the width of the second area 38*b* and greater than the width of the third area 38*c*.

As further shown in FIG. 2A, the air grille panel 22 has a length 40 and a height 42, and preferably has a unitary configuration 43. The length 40 of the air grille panel 22 is greater than the height 42 of the air grille panel 22. As further shown in FIG. 2A, the top end attachment portion 44 has a front side 46 and a back side 48 (see FIG. 3B), and has a plurality of openings 50, such as vertical slot openings 50*a*, formed through the top end attachment portion 44. As further shown in FIG. 2A, the bottom end attachment portion 56 has a front side 58, a back side 60 (see FIG. 3B), and has attachment openings 62, notched openings 64, fin portions 66, and air flow passages 68 between the fin portions 66.

FIG. 2A shows two air grille openings 70, including the first air grille opening 70*a* and the second air grille opening 70*b*, framed by two frame members 82, including the first frame member 82*a* and the second frame member 82*b*, and with two air grilles 100 coupled to the frame members 82. For example, the first air grille 100*a* is coupled to the first frame member 82*a*, which surrounds the first air grille opening 70*a*, and the second air grille 100*b* is coupled to the second frame member 82*b*, which surrounds the second air grille opening 70*b*. Each of the frame members 82 has a front side 84 (see FIG. 2A) and a back side 86 (see FIG. 3B), a shape 90 (see FIG. 2A), such as a rectangular shape 90*a* (see FIG. 2A), curved corners 92 (see FIG. 2A), and a perimeter 96 (see FIG. 2A). Each of the air grilles 100 has a front side 102 (see FIG. 2A), a back side 104 (see FIG. 3B), horizontal louvers 106 and vertical rib members 108 in a perpendicular arrangement 110 forming a grid, and air grille openings 112 between the horizontal louvers 106 and vertical rib members 108.

Now referring to FIG. 2B, FIG. 2B is an illustration of a front perspective view of a version of an air grille sidewall panel assembly 12 incorporating the air grille panel assembly 10 of FIG. 2A. As shown in FIG. 2B, the sidewall panel 120 comprises the top end portion 122, the bottom end portion 124, the front side 126, the back side 128, the first edge 130, and the second edge 132. As further shown in FIG. 2B, the sidewall panel 120 has a unitary configuration 129 and a curved profile 133. As further shown in FIG. 2B, the sidewall panel 120 has the plurality of window openings 134 formed through the sidewall panel 120, with a plurality of windows 136. Each window 136 (see FIG. 2B) is retained in the window opening 134. As further shown in FIG. 2B, the sidewall panel 120 has the first area 139*a* located between the window openings 134, the second area 139*b* located between the first edge 130 and the window opening 134, and the third area 139*c* located between the second edge 132 and the window opening 134. As further shown in FIG. 2B, the sidewall panel 120 has a length 137 and a height 138. The length 137 of the sidewall panel 120 is equal to, or substantially equal to, the length 40 (see FIG. 2A) of the air grille panel 22. The height 138 of the sidewall panel 120 is greater than the height 42 (see FIG. 2A) of the air grille panel 22. For example, the height 138 of the sidewall panel 120 may be 3-4 times greater than the height of the air grille panel 22. The sidewall panel 120 preferably has attachment fittings 142 attached to the top end portion 122.

As shown in FIG. 2B, the air grille sidewall panel assembly 12 includes the air grille panel assembly 10 comprising the air grille panel 22 with the air grille openings 70, the frame members 82, and the air grilles 100. FIG. 2B shows the top end 26, the bottom end 28 with the bottom end attachment portion 56, and the front side 30 of the air grille panel 22. As shown in FIG. 2B, the top end 26 of the air grille panel 22 of the air grille panel assembly 10 is coupled, or attached, to the bottom end portion 124 of the sidewall panel 120 to form the interface 140 between the air grille panel assembly 10 and the sidewall panel 120.

Now referring to FIG. 2C, FIG. 2C is an illustration of a front perspective view of the air grille sidewall panel assembly 12 of FIG. 2B in a first installation step 152 in an interior 148 of a cabin 150, such as a passenger cabin 150*a*. As shown in FIG. 2C, in the first installation step 152, the air grille sidewall panel assembly 12 is moved across a floor panel 146 toward the raceway 156, and toward the aircraft structure 144, such as the stowage bin 144*a*, to couple, or attach, the top end portion 122 of the sidewall panel 120 of the air grille sidewall panel assembly 12, to the aircraft structure 144, such as the stowage bin 144*a*. FIG. 2C shows the flange members 158, including the first flange member 158*a* and the second flange member 158*b* of the raceway 156. FIG. 2C further shows the interface 140 between the air grille panel assembly 10 and the sidewall panel 120.

Now referring to FIG. 2D, FIG. 2D is an illustration of a front perspective view of the air grille sidewall panel assembly 12 of FIG. 2C in a second installation step 175 in the interior 148 of the cabin 150, such as the passenger cabin 150*a*. As shown in FIG. 2D, in the second installation step 175, after the sidewall panel is attached to the aircraft structure 144, such as the stowage bin 144*a*, to form an interface 174 between the sidewall panel and the aircraft structure 144, such as the stowage bin 144*a*, the air grille sidewall panel assembly 12 is coupled, or attached, to the flange member 158, such as the first flange member 158*a*, of the raceway 156, which is disposed on the floor 180 and disposed near the floor panel 146 of the floor 180. In particular, the bottom end attachment portion 56 of the bottom end 28 of the air grille panel 22 is coupled, or attached, to the flange member 158, such as the first flange member 158*a*, of the raceway 156, to form an interface 176 between the air grille panel 22 of the air grille panel assembly 10 and the flange member 158, such as the first flange member 158*a*, of the raceway 156. FIG. 2D further shows the flange member 158, such as the second flange member 158*b* and the interface 140 between the air grille panel assembly 10 and the sidewall panel 120.

Now referring to FIG. 2E, FIG. 2E is an illustration of a front perspective view of a version of sidewall system 13 in an interior 148 of the cabin 150, such as the passenger cabin 150*a*, of the vehicle 14, such as the aircraft 16, and showing the air grilles 100 (see FIG. 2A) removed from the air grille panel assembly 10. As shown in FIG. 2E, the sidewall system 13 includes the air grille sidewall panel assembly 12 coupled, or attached, to the raceway assembly 154. The air grille sidewall panel assembly 12 comprises the air grille panel assembly 10 coupled, or attached, to the sidewall panel 120.

FIG. 2E shows two sidewall panels 120 installed next to each other with a gap 121 between the two sidewall panels 120. FIG. 2E shows the top end portion 122, the bottom end portion 124, the front side 126, and the back side 128 of the sidewall panel 120. FIG. 2E further shows the top end 26, the bottom end 28, the front side 30, the back side 32, and the first edge 34 of the air grille panel 22. FIG. 2E further shows the air grille opening 70 without the air grille 100 (see FIG. 2A), and shows the curved corners 76, and the shape 74, such as the rectangular shape 74a, and the perimeter 80 of the air grille opening 70. FIG. 2E further shows the frame member 82 surrounding the perimeter 80 of the air grille opening 70.

FIG. 2E further shows the bottom end 28 of the air grille panel 22 coupled, or attached, to the raceway assembly 154, disposed on the floor 180 and disposed adjacent the floor panel 146, and adjacent a fore-aft longitudinal floor structure 178 along the outboard set of seat legs 184 and seat shrouds 186. FIG. 2E further shows the seats 182, such as the palletized seats 182a, attached to the floor panels 146 and showing the outboard sides of the seats 182 near the sidewall system 13.

Figure 3A:
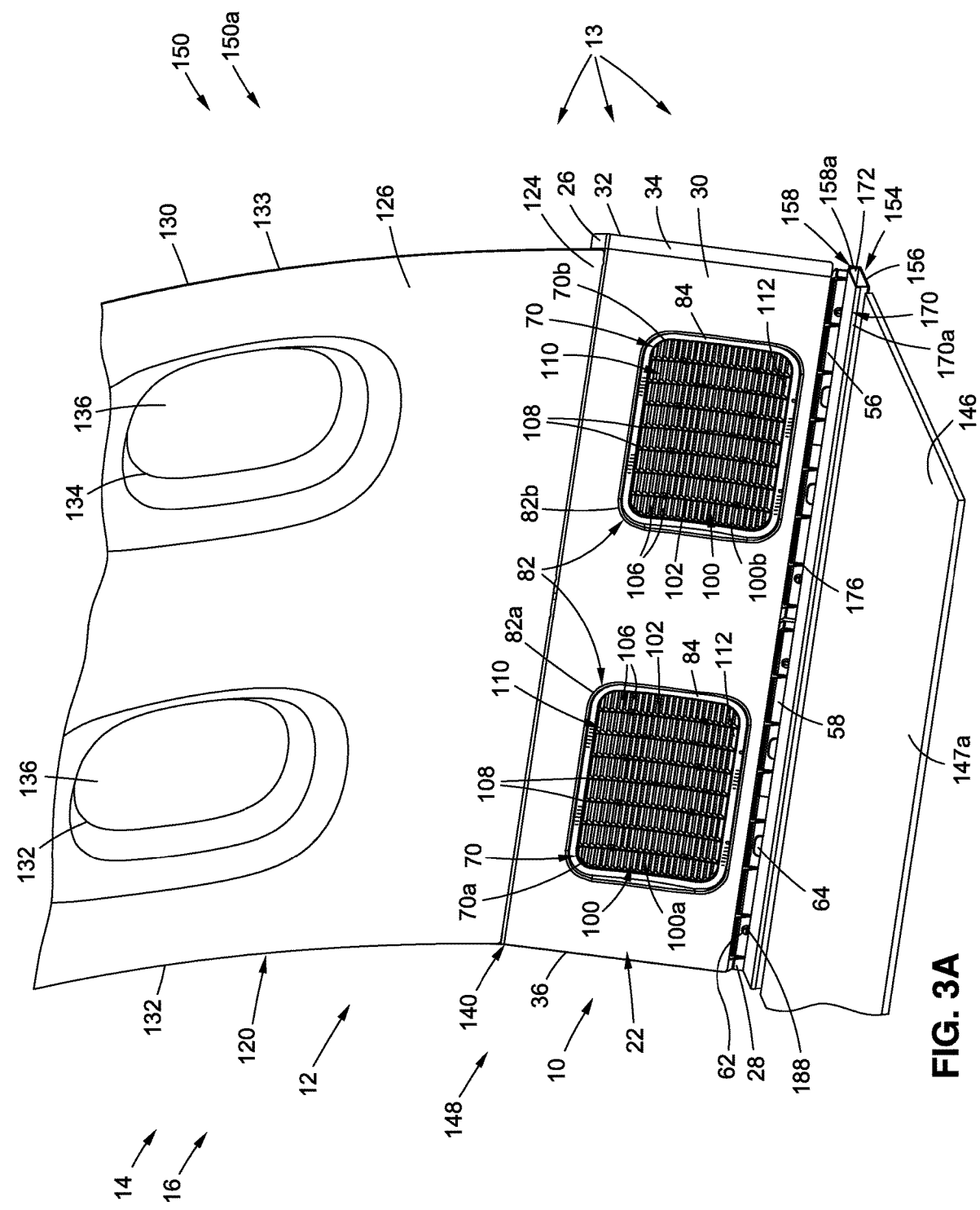
FIG. 3A is an illustration of a front perspective view of a version of a sidewall system including an air grille sidewall panel assembly of the disclosure.
Figure 3B:
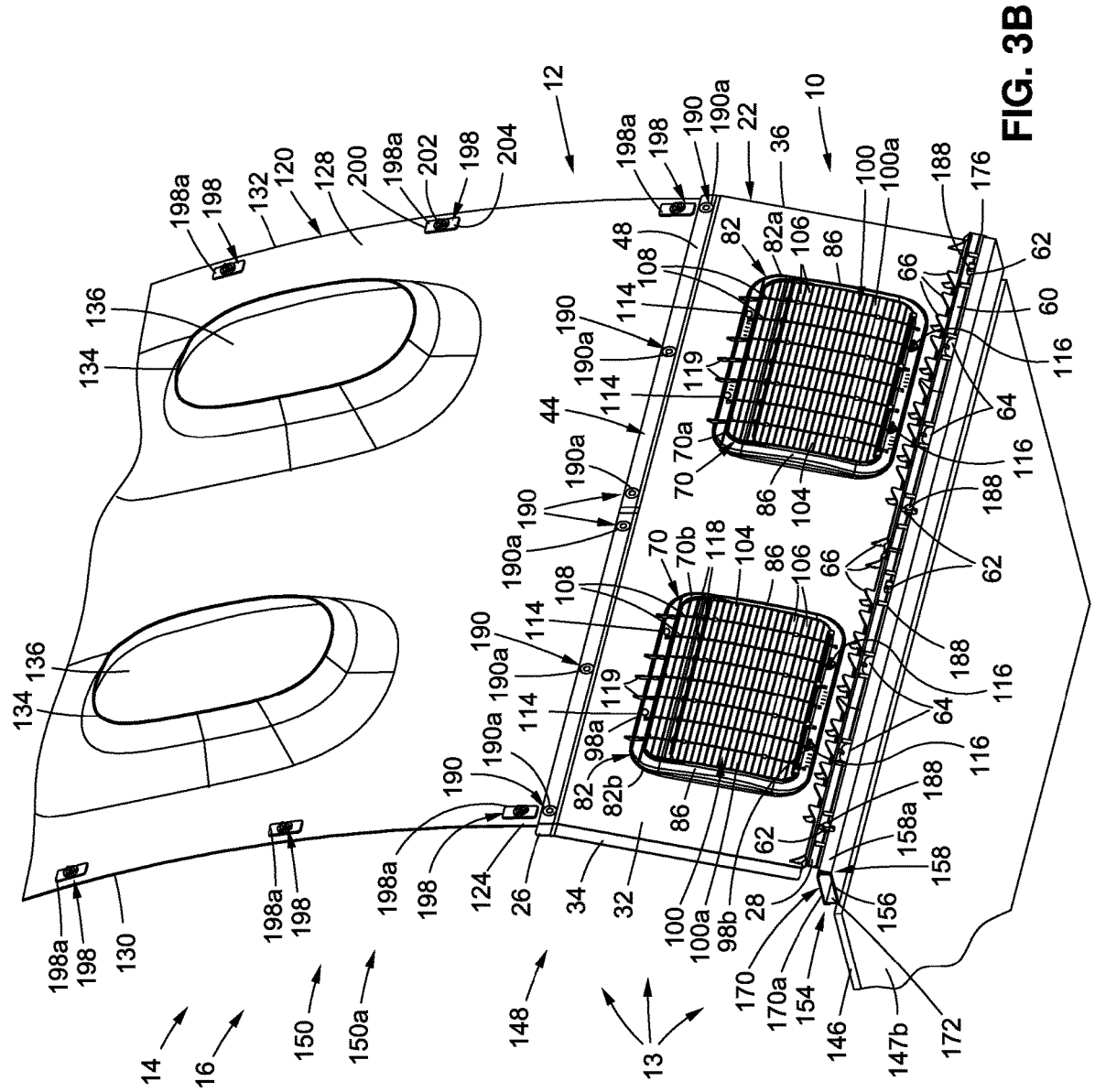
FIG. 3B is an illustration of a back perspective view of the sidewall system with the air grille sidewall panel assembly of FIG. 3A.

Now referring to FIGS. 3A and 3B, FIG. 3A is an illustration of a front perspective view of a version of the sidewall system 13, including the air grille sidewall panel assembly 12 and the raceway assembly 154, installed in the interior 148 of the cabin 150, such as the passenger cabin 150a, of the vehicle 14, such as the aircraft 16, and FIG. 3B is an illustration of a back perspective view of the sidewall system 13 with the air grille sidewall panel assembly 12 and the raceway assembly 154, of FIG. 3A, installed in the interior 148 of the cabin 150, such as the passenger cabin 150a, of the vehicle 14, such as the aircraft 16.

As shown in FIGS. 3A-3B, air grille panel assembly 10 of the air grille sidewall panel assembly 12 comprises the air grille panel 22 having the top end 26, the bottom end 28, the front side 30 (see FIG. 3A), the back side 32, the first edge 34, and the second edge 36. As further shown in FIGS. 3A-3B, the bottom end attachment portion 56 has the front side 58 (see FIG. 3A), the back side 60 (see FIG. 3B), attachment openings 62, notched openings 64, and fin portions 66 (see FIG. 3B). The attachment elements 188 (see FIGS. 3A-3B) are inserted through the attachment openings 62 to couple, or attach, the bottom end 28 of the air grille panel 22 to the flange member 158 (see FIG. 3B), such as the first flange member 158a (see FIG. 3B), of the raceway assembly 154 (see FIGS. 3A-3B).

FIGS. 3A-3B show two air grille openings 70, including the first air grille opening 70a and the second air grille opening 70b, framed by two frame members 82, including the first frame member 82a and the second frame member 82b, and with two air grilles 100, such as the first air grille 100a and the second air grille 100b, coupled to the frame members 82. Each of the frame members 82 has the front side 84 (see FIG. 3A) and the back side 86 (see FIG. 3B). Each of the air grilles 100 has the front side 102 (see FIG. 3A), the back side 104 (see FIG. 3B), horizontal louvers 106 (see FIGS. 3A-3B) and vertical rib members 108 (see FIGS. 3A-3B) in the perpendicular arrangement 110 (see FIG. 3A) forming a grid, and air grille openings 112 (see FIG. 3A) between the horizontal louvers 106 and vertical rib members 108.

FIG. 3B further shows top end attachment elements 114, such as fasteners, screws, pins, bolts, or other suitable fasteners, inserted through top attachment openings 98a to attach each air grille 100 to the back side 86 of each frame member 82. FIG. 3B further shows bottom end attachment elements 116, such as fasteners, screws, pins, bolts, or other suitable fasteners, inserted through bottom attachment openings 98b to attach each air grille 100 to the back side 86 of each frame member 82. FIG. 3B further shows headed fasteners 118 and attachment projections 119 on the back side 104 of each air grille 100. As further shown in FIGS. 3A-3B, the sidewall panel 120 comprises the bottom end portion 124, the front side 126 (see FIG. 3A), the back side 128 (see FIG. 3B), the first edge 130, the second edge 132, the curved profile 133 (see FIG. 3A), and the plurality of window openings 134 formed through the sidewall panel 120, with the plurality of windows 136. FIG. 3A further shows the interface 140 between the air grille panel assembly 10 and the sidewall panel 120.

As shown in FIGS. 3A-3B, the bottom end attachment portion 56 of the bottom end 28 of the air grille panel 22 is coupled, or attached, to the flange member 158, such as the first flange member 158a, of the raceway 156, to form the interface 176 between the air grille panel 22 of the air grille panel assembly 10 and the flange member 158, such as the first flange member 158a, of the raceway 156. FIGS. 3A-3B further show the raceway cover 170, such as the snap-in raceway cover, coupled, or attached, to the raceway 156, the closeout area 172 formed between the raceway cover 170 and the raceway 156, and the floor panel 146 adjacent the raceway assembly 154, where the floor panel has a top side 147a (see FIG. 3A) and a bottom side 147b (see FIG. 3B).

FIG. 3B further shows a plurality of interface attachment assemblies 190, such as a plurality of nut keeper assemblies 190a, attached through the back side 48 of the top end attachment portion 44 of the air grille panel 22, to attach the air grille panel 22 to the sidewall panel 120. Although FIG. 3B shows six (6) interface attachment assemblies 190 coupling or attaching the air grille panel 22 to the sidewall panel 120, more than six (6) interface attachment assemblies 190 or less than six (6) interface attachment assemblies 190 may be used.

FIG. 3B further shows a plurality of sidewall attachment assemblies 198, such as fastener plate assemblies 198a, located near the first edge 130 and the second edge 132 of the sidewall panel 120. As shown in FIG. 3B, each sidewall attachment assembly 198, such as each fastener plate assembly 198a, comprises a plate element 200, a fastener element 202, and a ring element 204. Although FIG. 3B shows six (6) sidewall attachment assemblies 198 attached to the back side 128 of the sidewall panel 120, more than six (6) sidewall attachment assemblies 198 or less than six (6) sidewall attachment assemblies 198 may be used. The plurality of sidewall attachment assemblies 198, such as the fastener plate assemblies 198a, may be used to attach the sidewall panel 120 to the interior frame of the vehicle 14, such as the aircraft 16, or to another vehicle structure or component.

Now referring to FIG. 4A, FIG. 4A is an illustration of a back perspective view of a version of a sidewall system 13, showing cover members 206, such as baffles 208, attached to air grilles 100 of the air grille panel assembly 10 of the air grille sidewall panel assembly 12. As shown in FIG. 4A, cover members 206, such as the first cover member 206a and the second cover member 206b, are releasably attached to the back side 104 of each of the air grilles 100, such as the first air grille 100a (see FIG. 3B) and the second air grille 100b, and disposed over substantially all of the back side 104 of the air grille 100. As shown in FIG. 4A, preferably, the air grille panel assembly 10 comprises two cover members 206, such as the first cover member 206a and the second cover member 206b, and preferably the cover members 206 are in the form of baffles 208, or backing baffles, such as the first baffle 208a and the second baffle 208b.

As shown in FIG. 4A, each cover member 206, such as the baffle 208, comprises a first side 210, or front side, facing the back side 104 of the air grille 100 and facing inboard, and comprises a second side 212, or back side, facing outboard. Each cover member 206, such as the baffle 208, further comprises a plurality of edges 214 (see FIG. 4A), such as a top edge, a bottom edge, and two side edges. Preferably, one of the plurality of edges 214 is a fixed hinged edge 214a (see FIG. 4A), such as the top edge, that is hingedly fixed to the top end of the air grille 100, and is configured to be releasably attached for movement. As shown in FIG. 4A, each cover member 206, such as the baffle 208, further has curved corners 222, or rounded corners, on each of the four (4) corners of the cover member 206, such as the baffle 208, and each has a perimeter 226.

As shown in FIG. 4A, each cover member 206, such as in the form of the baffle 208, further comprises a plurality of holes 216, such as in the form of a horizontal row of holes 216a, that are configured to receive, and receive, the plurality of headed fasteners 118 projecting from the back side 104 of the air grille 100, when the cover member 206, such as the baffle 208, is in a closed position 228. The plurality of holes 216 (see FIG. 4A), such as the horizontal row of holes 216a (see FIG. 4A), are configured to fit over a corresponding number of rows of the headed fasteners 118 (see FIG. 4A) on the air grille 100 and are configured to removably attach the cover member 206, such as the baffle 208, to the air grille 100, along the horizontal row of holes 216a.

When the cover member 206, such as the baffle 208, is in an open position 230 (see FIG. 4A), the cover member 206, such as the baffle 208, is moved, or lifted, away from the air grille 100, and the plurality of headed fasteners 118 detach from the plurality of holes 216. The position and size of the plurality of holes 216 and the headed fasteners 118 are configured so that the headed fasteners 118 protrude through the plurality of holes 216 in the cover member 206, such as the baffle 208, during normal flight operations, when the vehicle 14 comprises an aircraft 16, and the cover member 206, such as the baffle 208, at least partially releases from the air grille 100 upon occurrence of a decompression event 270 (see FIG. 1A) that is rapid.

Each cover member 206, such as the baffle 208, is configured to move between the closed position 228 and the open position 230, when air flow 266 (see FIG. 1A) moves through the air grille opening 70 (see FIG. 2E) and the air grille 100 and/or when there is a decompression event 270 (see FIG. 1A). For example, under pressure, the cover member 206, such as the baffle 208, is blown away from the air grille 100, allowing a specified amount of air to pass between the cabin 150 (see FIG. 4A), such as the passenger cabin 150a (see FIG. 4A), and the underfloor area 272 (see FIG. 1B), such as the cargo area 274 (see FIG. 1B), or lower fuselage, in a given amount of time. The air grille 100 and the cover member 206, such as the baffle 208, are designed to allow air flow 266 (see FIG. 1A) to pass under a specified pressure, but need to be robust enough for passenger wear and tear.

FIG. 4A shows a decompression air flow path direction 232 through the air grille 100, such as the second air grille 100b, when the cover member 206, such as the baffle 208, is in the open position 230. FIG. 4A further shows an air distribution air flow path direction 234 through the air flow passages 68 between the fin portions 66.

FIG. 4A further shows the horizontal louvers 106, the vertical rib members 108, the curved corners 111, the air grille openings 112, the headed fasteners 118, and the attachment projections 119, of the air grille 100, such as the second air grille 100b. FIG. 4A further shows the frame members 82, such as the first frame member 82a and the second frame member 82b, and shows the top attachment openings 98a in the back sides 86 of the frame members 82, and shows the top end attachment elements 114 inserted through the top attachment openings 98a.

FIG. 4A further shows the top end 26, the bottom end 28, the back side 32, the first edge 34, the second edge 36, the back side 48 of the top end attachment portion 44, and the back side 60 of the bottom end attachment portion 56, of the air grille panel 22. FIG. 4A further shows the attachment elements 188, such as fasteners 188a, inserted through the attachment openings 62 in the bottom end attachment portion 56, and shows the notched openings 64, the fin portions 66, and the air flow passages 68.

FIG. 4A further shows the bottom end portion 124 of the sidewall panel 120 coupled, or attached, to the top end attachment portion 44 of the air grille panel 22, with multiple interface attachment assemblies 190, such as nut keeper assemblies 190a, including the nut element 192 and the keeper element 194. FIG. 4A further shows sidewall attachment assemblies 198, such as fastener plate assemblies 198a, attached to the back side 128 of the sidewall panel 120. As shown in FIG. 4A, each of the sidewall attachment assemblies 198, such as fastener plate assemblies 198a, comprises a plate element 200, a fastener element 202, and a ring element 204.

FIG. 4A further shows the floor panel 146 with a top side 147a and a bottom side 147b adjacent to the raceway assembly 154. As shown in FIG. 4A, the raceway assembly 154 comprises the raceway 156, the flange members 158, such as the first flange member 158a and the second flange member 158b, and the raceway cover 170, such as the snap-in raceway cover 170a.

Now referring to FIG. 4B, FIG. 4B is an illustration of an enlarged back perspective view of an interface attachment assembly 190, such as a nut keeper assembly 190a, for an air grille sidewall panel assembly 12 (see FIGS. 1B, 4A) of the disclosure. As shown in FIG. 4B, the interface attachment assembly 190 comprises the nut keeper assembly 190a, including the nut element 192 and the keeper element 194 or washer, and comprises the stud element 196. The stud element 196 is attached, such as by bonding or another suitable attachment mechanism, to the back side 128 of the bottom end portion 124 of the sidewall panel 120. The sidewall panel 120, or upper panel, has a row of stud elements 196 (see FIG. 4B) that are fixed or bonded to the back side 128 (see FIG. 4B) of the sidewall panel 120 (see FIG. 4B), facing toward the front side 30 (see FIGS. 2A, 4B) of the interfacing air grille panel 22, or lower panel. The air grille panel 22 has a row of openings 50 (see FIGS. 2A, 4B), such as vertical slot openings 50a (see FIGS. 2A,4B) that the stud elements 196 interface to, and are fastened on, to the back side 32 (see FIGS. 2A, 4B) of the air grille panel 22, with the nut keeper assembly 190a (see FIG. 4B), including the nut element 192 (see FIG. 4B) and the keeper element 194 (see FIG. 4B) that allows for adjustment of the stud element 196 in the opening 50, such as the vertical slot opening 50a. A projection portion 197 (see FIG. 4B) of the stud element 196 is configured to be inserted, and is inserted through, the opening 50 (see FIG. 4B), such as the vertical slot opening 50a (see FIG. 4B), formed through the air grille panel 22 (see FIG. 4B). Once inserted through the opening 50, such as the vertical slot opening 50a, the projection portion 197 of the stud element 196 is configured to be inserted, and is inserted through, a central through hole 195 (see FIG. 4B) of the keeper element 194 (see FIG. 4B), and is configured to be inserted, and is inserted through, a through opening 193 (see FIG. 4B) of the nut element 192 (see FIG. 4B). The interface attachment assembly 190, such as the nut keeper assembly 190a, is configured to couple, or attach, the sidewall panel 120 to the air grille panel 22 of the air grille panel assembly 10 (see FIG. 4A), to form the interface 140 (see FIG. 4A). FIG. 4B further shows the plate element 200 of the sidewall attachment assembly 198 (see FIG. 4A).

Figure 5A:
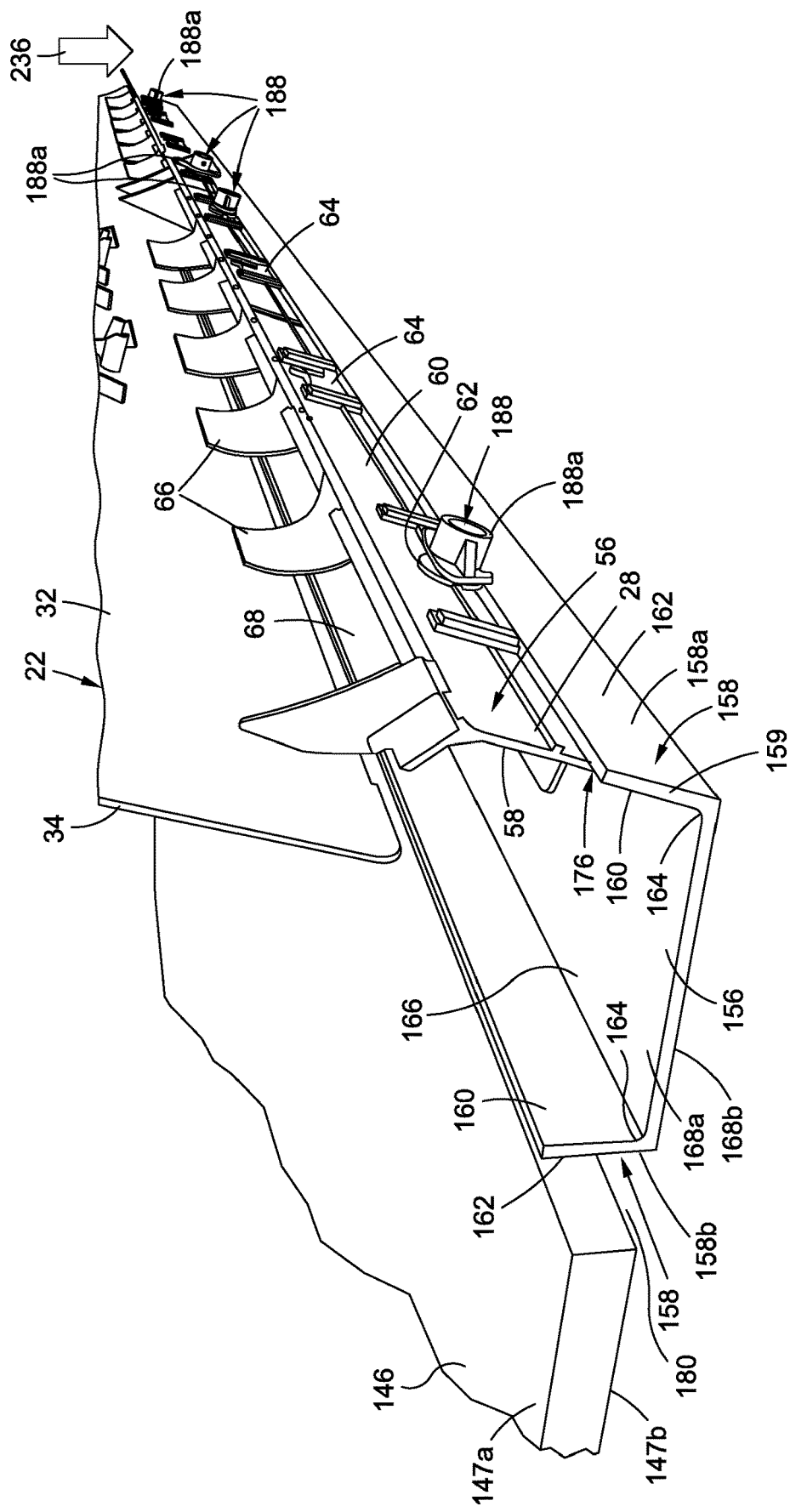
FIG. 5A is an illustration of a back perspective view of a bottom end of an air grille panel, installed in a first installation step, to a flange member of a raceway assembly.
Figure 5B:
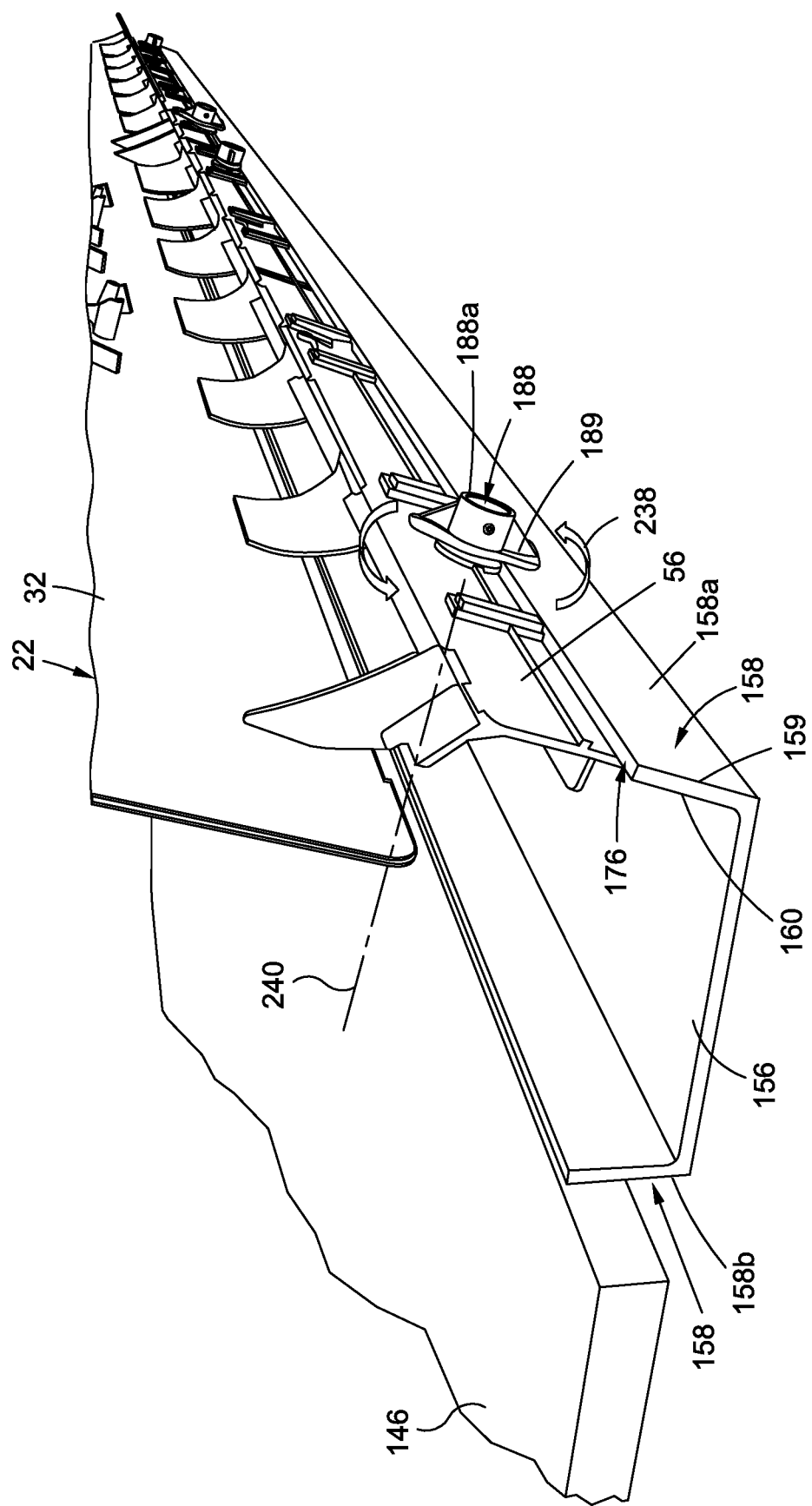
FIG. 5B is an illustration of a back perspective view of the air grille panel of FIG. 5A, installed in a second installation step, to the flange member.
Figure 5C:
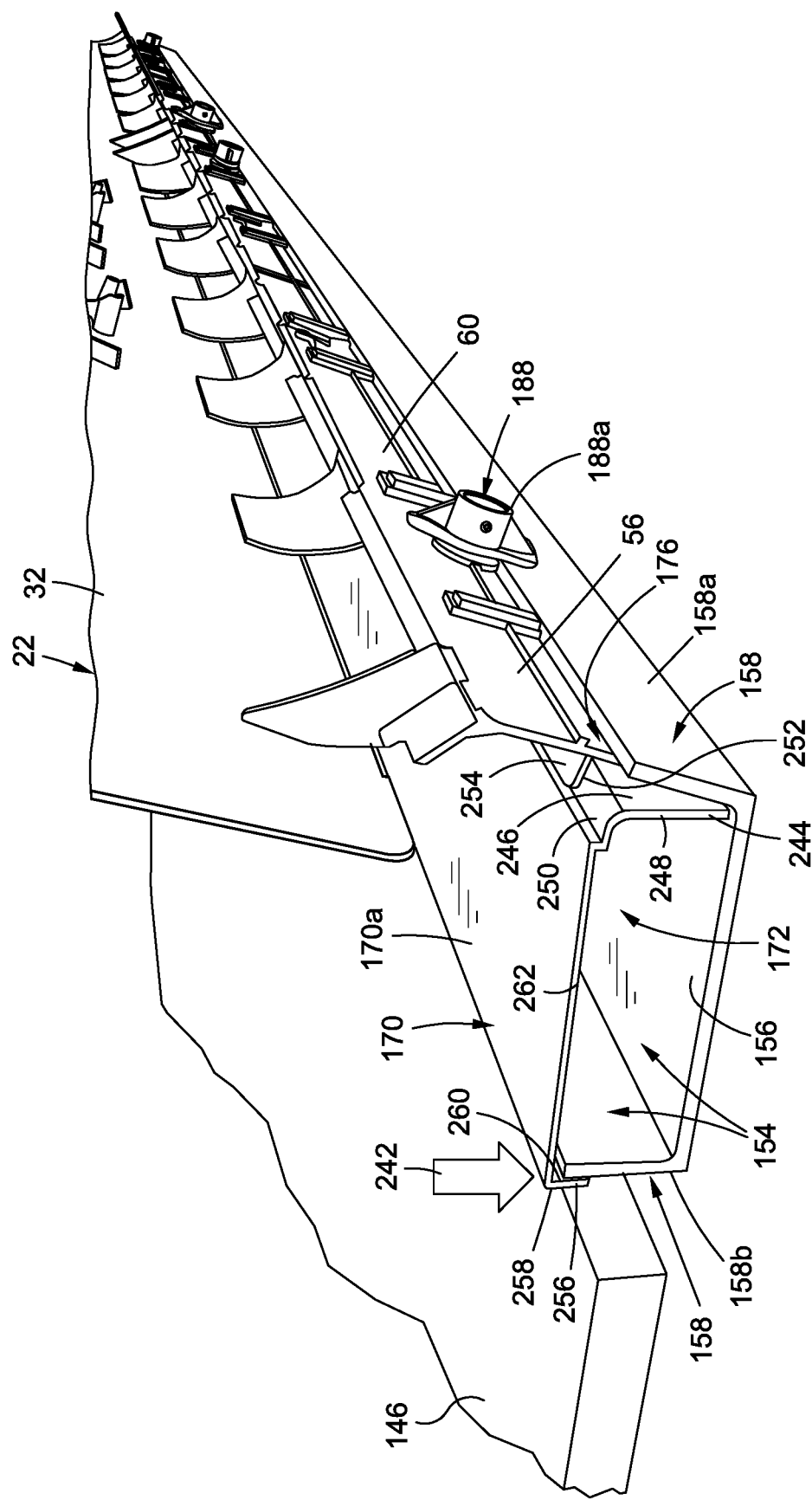
FIG. 5C is an illustration of a back perspective view of the air grille panel of FIG. 5B, showing a raceway cover, installed in a snap-in installation step, to a raceway to form a raceway assembly.

Now referring to FIGS. 5A-5C, FIG. 5A is an illustration of a back perspective view of a bottom end 28 of an air grille panel 22, installed in a first installation step 236, to the flange member 158, such as the first flange member 158a, for example, the floor sill flange 159, of a raceway assembly 154 (see FIGS. 1B, 5C). FIG. 5B is an illustration of a back perspective view of the air grille panel 22 of FIG. 5A, installed in a second installation step 238, to the flange member 158, such as the first flange member 158a, for example, the floor sill flange 159, of the raceway assembly 154. FIG. 5C is an illustration of a back perspective view of the air grille panel 22 of FIG. 5B, showing a raceway cover 170, such as a snap-in raceway cover 170a, installed in a snap-in installation step 242 to a raceway 156, to form a raceway assembly 154.

As shown in FIG. 5A, the bottom end 28 of the air grille panel 22 is coupled to the first flange member 158a, via attachment elements 188, such as fasteners 188a, to create an interface 176 between the back side 60 of the bottom end attachment portion 56 and an interior side 160 of the flange member 158, such as the first flange member 158a, for example, the floor sill flange 159. FIG. 5A shows the back side 32, the first edge 34, the front side 58 of the bottom end attachment portion 56, the attachment openings 62, the notched openings 64, and the fin portions 66 of the air grille panel 22. The first installation step 236 involves coupling the bottom end 28 of the air grille panel 22 to the first flange member 158a in a downward direction and inserting attachment elements 188, such as fasteners 188a, for example, rotating fasteners with flanges, into the attachment openings 62.

As shown in FIG. 5A, the raceway 156 comprises the first flange member 158a and the second flange member 158b, each having an interior side 160, an exterior side 162, and an angled configuration 164. Preferably, the first flange member 158a and the second flange member 158b are substantially vertical in orientation. As further shown in FIG. 5A, the raceway 156 comprises an elongated body 166 having an interior surface 168a and an exterior surface 168b disposed on the floor 180. The elongated body 166 is formed between the first flange member 158a and the second flange member 158b. FIG. 5A further shows a top side 147a and a bottom side 147b of the floor panel 146 positioned adjacent to the flange member 158, such as the second flange member 158b, of the raceway 156.

FIG. 5B shows the second installation step 238, which involves rotating the attachment elements 188, such as the fasteners 188a, 90 degrees around an axis of rotation 240. As shown in FIG. 5B, the bottom end attachment portion 56 of the air grille panel 22 is clamped against the interior side 160 of the flange member 158, such as the first flange member 158a, by rotating the attachment element 188, such as the fastener 188a, for example, in the form of a rotating fastener with flange portions 189. When the attachment element 188, such as the fastener 188a, for example, in the form of the rotating fastener with flange portions 189, is rotated 90 degrees, the flange portions 189 of the fastener 188a clamp the bottom end attachment portion 56 of the air grille panel 22 against the interior side 160 of the flange member 158, such as the first flange member 158a, to form the interface 176 between the air grille panel 22 and the first flange member 158a, such as the floor sill flange 159.

After the bottom end attachment portion 56 of the air grille panel 22 is secured against, and to, the interior side 160 of the first flange member 158a, the raceway cover 170, such as the snap-in raceway cover 170a, is coupled to the raceway 156 with a snap-in installation step 242, as shown in FIG. 5C. FIG. 5C shows the attachment element 188, such as the fastener 188a, securing the air grille panel 22 to the flange member 158, such as the first flange member 158a. FIG. 5C further shows the interface 176, the raceway assembly 154 with the raceway 156 and the flange members 158, including the first flange member 158a and the second flange member 158b, and the closeout area 172, and the floor panel 146 adjacent the raceway assembly 154.

As shown in FIG. 5C, the raceway cover 170 comprises a first end portion 244 having an interior side 248 and having an exterior side 246 adjacent the first flange member 158a, when the raceway cover 170 is coupled to the raceway 156. As shown in FIG. 5C, the first end portion 244 has an abutment portion 250 that abuts an underside 252 of a flange element 254 of the bottom end attachment portion 56, when the raceway cover 170 is coupled to the raceway 156. As further shown in FIG. 5C, the raceway cover 170 comprises a second end portion 256 having an exterior side 258, and an interior side 260 that abuts the second flange member 158b, when the raceway cover 170 is coupled to the raceway 156. As further shown in FIG. 5C, the raceway cover 170 has a body portion 262 disposed between the first end portion 244 and the second end portion 256.

Figure 6:
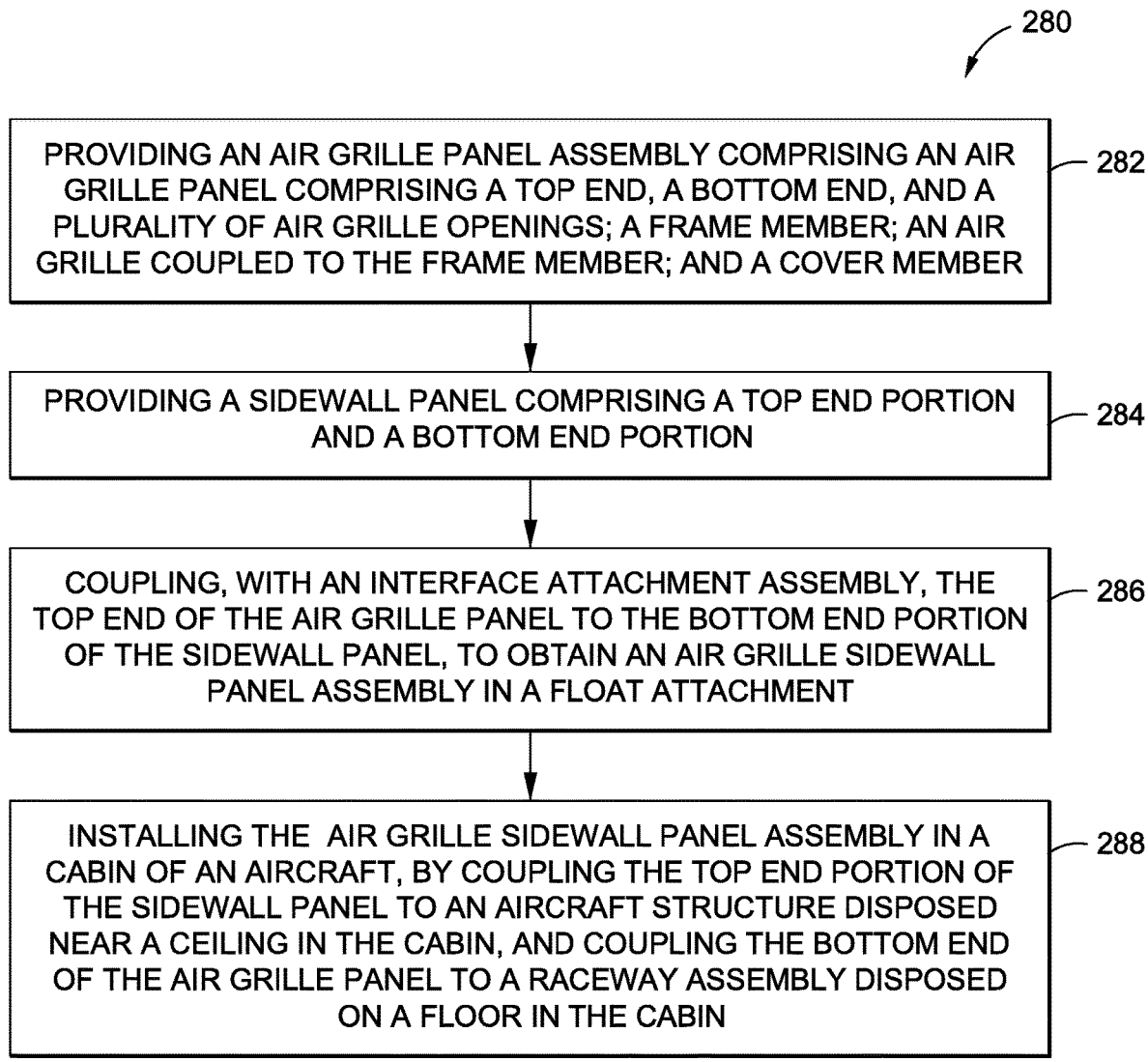
FIG. 6 is an illustration of a flow diagram of a version of a method of the disclosure.

Now referring to FIG. 6, FIG. 6 is an illustration of a flow diagram of a version of a method 280 of the disclosure. In another version of the disclosure, there is provided the method 280 (see FIG. 6) of installing an air grille sidewall panel assembly 12 (see FIG. 1B) in a vehicle 14 (see FIG. 1B), such as an aircraft 16 (see FIG. 1B).

The blocks in FIG. 6 represent operations and/or portions thereof, or elements, and lines connecting the various blocks do not imply any particular order or dependency of the operations or portions thereof, or elements. FIG. 6 and the disclosure of the steps of the method 280 set forth herein should not be interpreted as necessarily determining a sequence in which the steps are to be performed. Rather, although one illustrative order is indicated, it is to be understood that the sequence of the steps may be modified when appropriate. Accordingly, certain operations may be performed in a different order or simultaneously.

As shown in FIG. 6, the method 280 comprises the step of providing 282 an air grille panel assembly 10 (see FIG. 1A). As discussed in detail above, the air grille panel assembly 10 comprises an air grille panel 22 (see FIG. 1A) comprising a top end 26 (see FIG. 1A), a bottom end 28 (see FIG. 1A), and a plurality of air grille openings 70 (see FIG. 1A). The air grille panel assembly 10 further comprises a frame member 82 (see FIG. 1A) disposed around a perimeter 80 (see FIG. 1A) of each of the plurality of air grille openings 70, to define each of the plurality of air grille openings 70.

The air grille panel assembly 10 further comprises an air grille 100 (see FIG. 1A) coupled to the frame member 82 and covering each of the plurality of air grille openings 70. The air grille panel assembly 10 further comprises a cover member 206 (see FIG. 1A) releasably attached to a back side 104 (see FIG. 1A) of the air grille 100 and configured to move between a closed position 228 (see FIG. 4A) and an open position 230 (see FIG. 4A).

The step of providing 282 (see FIG. 6) the air grille panel assembly 10 may further comprise providing the air grille panel assembly 10 (see FIG. 1A) comprising the air grille panel 22 comprising two air grille openings 70 (see FIG. 1A), each air grille opening 70 having a size 72 (see FIG. 1A) and a shape 74 (see FIG. 1A) that are identical or the same, or substantially identical or the same, and each air grille opening 70 having the frame member 82 (see FIG. 1A), the air grille 100 (see FIG. 1A), and the cover member 206 (see FIG. 1A), or baffle 208 (see FIG. 1A).

The step of providing 282 (see FIG. 6) the air grille panel assembly 10 may further comprise providing the air grille panel assembly 10 comprising the air grille panel 22 comprising a top end attachment portion 44 having a plurality of vertical slot openings 50a (see FIG. 2A). Each of the plurality of vertical slot openings 50a receives, or is configured to receive, a stud element 196 (see FIG. 1B) of the interface attachment assembly 190. The stud element 196 is preferably disposed on a back side 128 (see FIG. 4A) of the sidewall panel 120 (see FIG. 4A).

The step of providing 282 (see FIG. 6) the air grille panel assembly 10 may further comprise providing the air grille panel assembly 10 (see FIG. 1A) comprising the frame member 82 (see FIG. 1A) having curved corners 92 (see FIG. 1A) and a rectangular shape 90a (see FIG. 1A).

As shown in FIG. 6, the method 280 further comprises the step of providing 284 a sidewall panel 120 (see FIG. 1AB), as discussed in detail above, comprising a top end portion 122 (see FIG. 2B) and a bottom end portion 124 (see FIG. 2B).

As shown in FIG. 6, the method 280 further comprises the step of coupling 286, with an interface attachment assembly 190 (see FIG. 1B), as discussed in detail above, the top end 26 of the air grille panel 22 to the bottom end portion 124 of the sidewall panel 120, to obtain the air grille sidewall panel assembly 12 (see FIG. 1B) in a float attachment 141 (see FIG. 1B). The step of coupling 286 (see FIG. 6), with the interface attachment assembly 190 (see FIG. 1B), further comprises coupling 286, with the interface attachment assembly 190 comprising a plurality of stud elements 196 (see FIG. 1B) disposed on a back side 128 (see FIG. 4B) at a bottom end portion 124 (see FIG. 4B) of the sidewall panel 120 (see FIG. 4B), and further comprising a plurality of nut keeper assemblies 190a (see FIG. 4B). Each of the plurality of stud elements 196 is inserted through one of the plurality of vertical slot openings 50a (see FIG. 4B), and inserted through one of the plurality of nut keeper assemblies 190a, to attach each nut keeper assembly 190a to each stud element 196.

As shown in FIG. 6, the method 280 further comprises the step of installing 288 the air grille sidewall panel assembly 12 in a cabin 150 (see FIG. 1B) of the aircraft 16, by coupling the top end portion 122 of the sidewall panel 120 (see FIG. 1B) to an aircraft structure 144 (see FIG. 2D) disposed near a ceiling 145 (see FIG. 1B) in the cabin 150, and coupling the bottom end 28 of the air grille panel 22 to a raceway assembly 154 (see FIG. 1B) disposed on a floor 180 (see FIG. 1B) in the cabin 150.

The step of installing 288 (see FIG. 6) the air grille sidewall panel assembly 12 (see FIG. 1B) further comprises installing 288 the air grille sidewall panel assembly 12, by coupling attachment fittings 142 (see FIG. 2B) disposed at the top end portion 122 (see FIG. 2B) of the sidewall panel 120 (see FIG. 2B) to the aircraft structure 144 (see FIG. 2C) comprising a stowage bin 144a (see FIG. 2C) disposed near the ceiling 145 (see FIG. 1B) in the cabin 150 (see FIG. 1B).

The float attachment 141 (see FIG. 1B) of the air grille sidewall panel assembly 12 (see FIG. 1B) allows for a vertical adjustment 52 (see FIG. 1A) to accommodate different installed positions 54 (see FIG. 1A) of the air grille sidewall panel assembly 12 in the cabin 150 of the aircraft 16.

Figure 7:
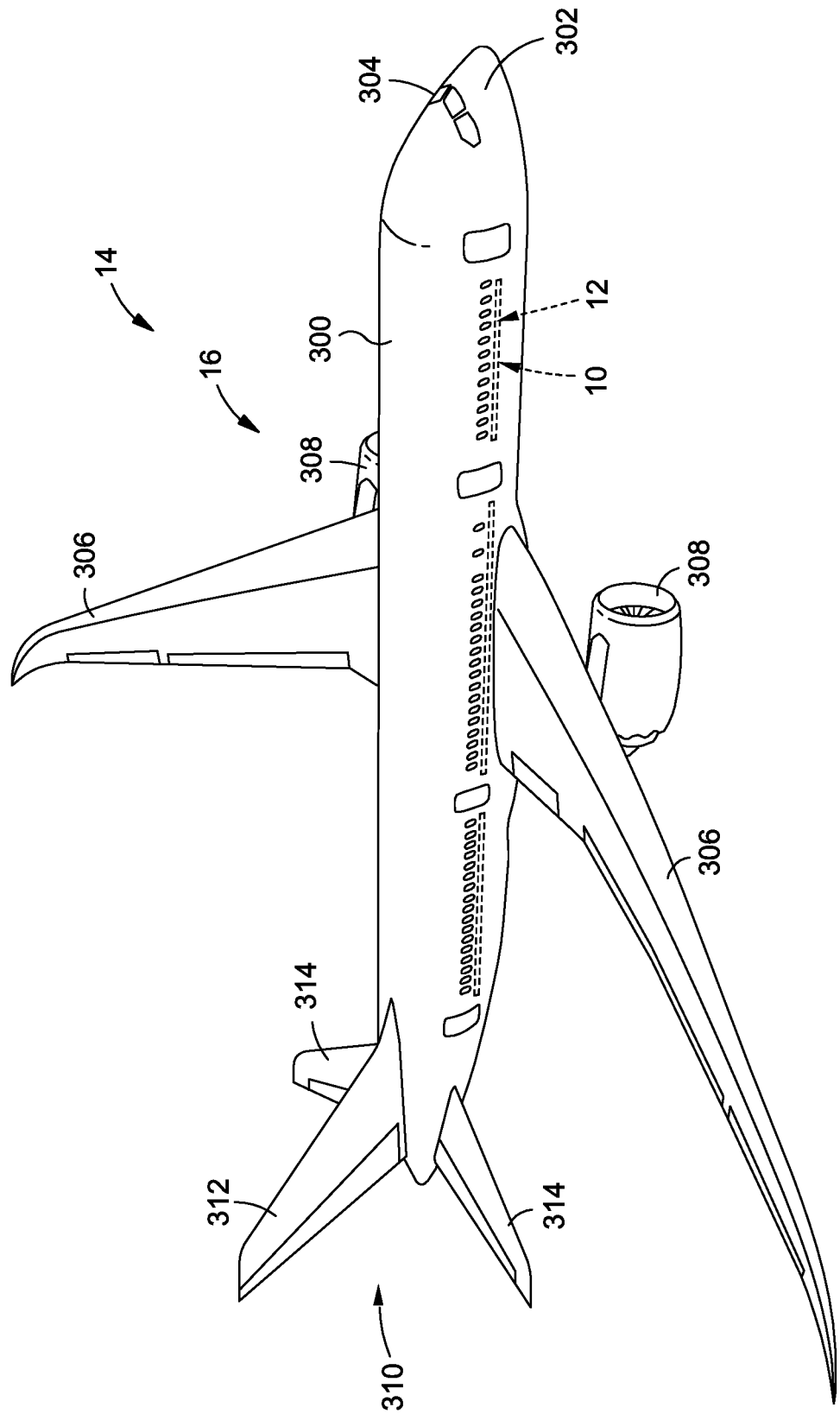
FIG. 7 is an illustration of a perspective view of an aircraft that incorporates a version of an air grille sidewall panel assembly with an air grille panel assembly of the disclosure.

Now referring to FIG. 7, FIG. 7 is an illustration of a perspective view of a vehicle 14, such as an aircraft 16, that incorporates a version of an air grille sidewall panel assembly 12 with an air grille panel assembly 10 of the disclosure. As further shown in FIG. 7, the vehicle 14, such as in the form of aircraft 16, comprises a fuselage 300, a nose 302, a cockpit 304, wings 306, engines 308, and an empennage 310 comprising a vertical stabilizer 312 and horizontal stabilizers 314. Although the vehicle 14, such as the aircraft 16, shown in FIG. 7 is generally representative of a commercial passenger aircraft having a version of the air grille sidewall panel assembly 12 with the air grille panel assembly 10, the teachings of the disclosed versions and examples may be applied to other vehicles. For example, the teachings of the disclosed versions and examples may be applied to cargo aircraft, military aircraft, rotorcraft, and other types of aircraft or air vehicles. In addition, the teachings of the disclosed versions and examples may be applied to boats 18 (see FIG. 1B), trains 20 (see FIG. 1B), and other passenger carrying vehicles. In addition, the teachings of the disclosed versions and examples may be applied to structures where an air grille panel or decompression panel is required, for example, commercial buildings and residential homes air grille panel replacement, and other suitable structures.

Figure 8:
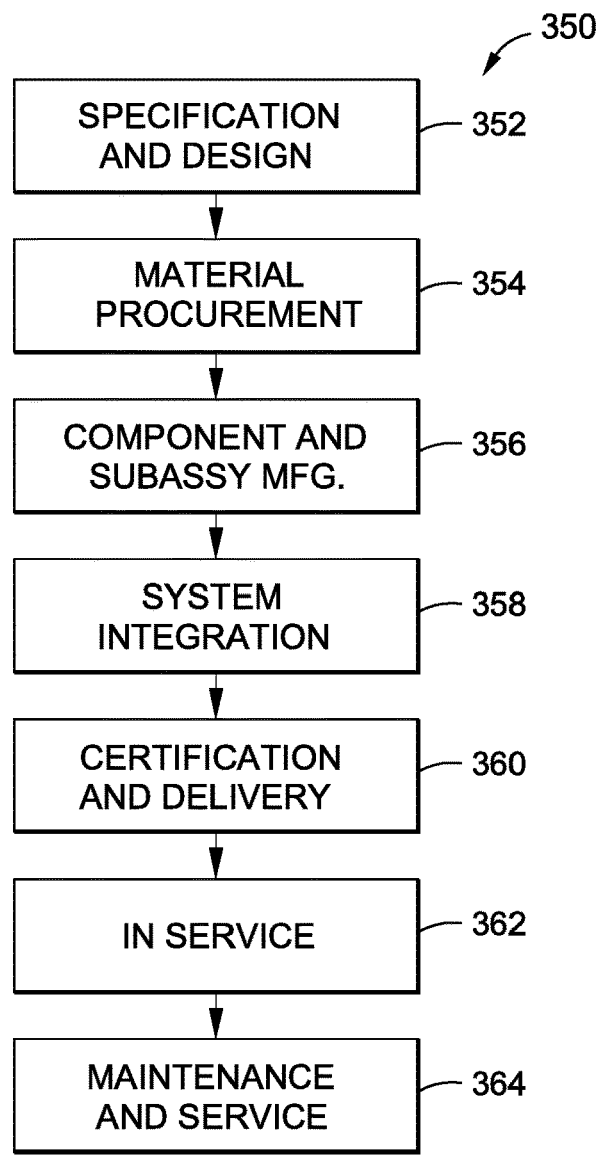
FIG. 8 is an illustration of a flow diagram of an exemplary aircraft manufacturing and service method.
Figure 9:
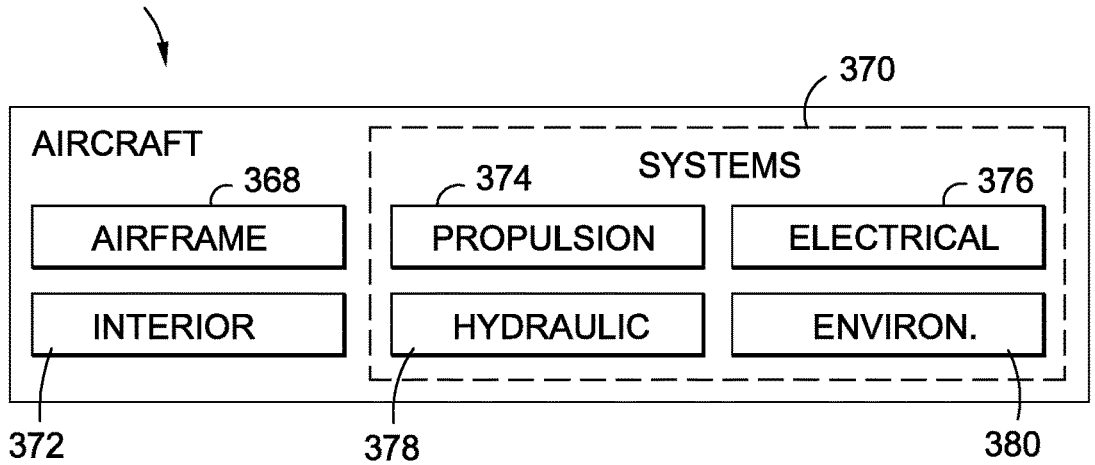
FIG. 9 is an illustration of an exemplary block diagram of an aircraft.

Now referring to FIGS. 8 and 9, FIG. 8 is an illustration of a flow diagram of an exemplary aircraft manufacturing and service method 350, and FIG. 9 is an illustration of an exemplary block diagram of an aircraft 366. Referring to FIGS. 8 and 9, versions of the disclosure may be described in the context of the aircraft manufacturing and service method 350 as shown in FIG. 8, and the aircraft 366 as shown in FIG. 9.

During pre-production, exemplary aircraft manufacturing and service method 350 may include specification and design 352 of the aircraft 366 and material procurement 354. During manufacturing, component and subassembly manufacturing 356 and system integration 358 of the aircraft 366 takes place. Thereafter, the aircraft 366 may go through certification and delivery 360 in order to be placed in service 362. While in service 362 by a customer, the aircraft 366 may be scheduled for routine maintenance and service 364 (which may also include modification, reconfiguration, refurbishment, and other suitable services).

Each of the processes of the aircraft manufacturing and service method 350 may be performed or carried out by a system integrator, a third party, and/or an operator (e.g., a customer). For the purposes of this description, a system integrator may include, without limitation, any number of aircraft manufacturers and major-system subcontractors. A third party may include, without limitation, any number of vendors, subcontractors, and suppliers. An operator may include an airline, leasing company, military entity, service organization, and other suitable operators.

As shown in FIG. 9, the aircraft 366 produced by the exemplary aircraft manufacturing and service method 350 may include an airframe 368 with a plurality of systems 370 and an interior 372. Examples of the plurality of systems 370 may include one or more of a propulsion system 374, an electrical system 376, a hydraulic system 378, and an environmental system 380. Any number of other systems may be included. Although an aerospace example is shown, the principles of the disclosure may be applied to other industries, such as the automotive industry.

Methods and systems embodied herein may be employed during any one or more of the stages of the aircraft manufacturing and service method 350. For example, components or subassemblies corresponding to component and subassembly manufacturing 356 may be fabricated or manufactured in a manner similar to components or subassemblies produced while the aircraft 366 is in service 362. Also, one or more apparatuses, methods, or a combination thereof, may be utilized during component and subassembly manufacturing 356 and system integration 358, for example, by substantially expediting assembly of or reducing the cost of the aircraft 366. Similarly, one or more of apparatuses, methods, or a combination thereof, may be utilized while the aircraft 366 is in service 362, for example and without limitation, to maintenance and service 364.

Disclosed versions of the air grille panel assembly 10 (see FIGS. 1A, 2A), the air grille sidewall panel assembly 12 (see FIGS. 1B, 2B, 3A-3B), the sidewall system 13 (see FIG. 2E), and the method 280 (see FIG. 6) provide for coupling of an air grill panel assembly 10 (see FIG. 1A) to a sidewall panel 120 (see FIG. 1B), via a float attachment 141 (see FIG. 1B), with an interface attachment assembly 190 (see FIGS. 1B, 4B), that allows for a vertical adjustment 52 (see FIG. 1A), to accommodate different installed positions 54 (see FIG. 1A), if needed, of the air grille panel assembly 10, or the air grille sidewall panel assembly 12, in the cabin 150 (see FIG. 1B), such as the passenger cabin 150a (see FIG. 1B), of a vehicle 14 (see FIG. 1B), such as an aircraft 16 (see FIG. 1B), or another suitable vehicle. The air grille panel 22 (see FIG. 1A) of the air grille panel assembly 10 (see FIGS. 1A, 2A) is mechanically fastened to the sidewall panel 120 (see FIG. 1B), and the float attachment 141 (see FIG. 1B) allows for vertical movement up and down, to allow the air grille panel 22 to engage a flange member 158 (see FIG. 1B), such as a first flange member 158a (see FIG. 1B), for example, a floor sill flange 159 (see FIGS. 1B, 5A), of the raceway 156 (see FIG. 1B) and the raceway assembly 154 (see FIG. 1B), taking up any vertical tolerance. The sidewall panel 120, or upper panel, has a row of stud elements 196 (see FIG. 4B) that are fixed or bonded to the back side 128 (see FIG. 4B) of the sidewall panel 120 (see FIG. 4B), facing toward the front side 30 (see FIGS. 2A, 4B) of the interfacing air grille panel 22, or lower panel. The air grille panel 22 has a row of openings 50 (see FIGS. 2A, 4B), such as vertical slot openings 50a (see FIGS. 2A,4B) that the stud elements 196 interface to, and are fastened on, to the back side 32 (see FIGS. 2A, 4B) of the air grille panel 22, with a nut keeper assembly 190a (see FIG. 4B), including a nut element 192 (see FIG. 4B) and a keeper element 194 (see FIG. 4B) that allows for adjustment of the stud element 196 in the opening 50, such as the vertical slot opening 50a.

Because the air grille panel assembly 10 is coupled or attached to, and incorporated with, the sidewall panel 120, to form the air grille sidewall panel assembly 12, the time for installation in the vehicle, such as the aircraft 16, or other vehicle, is reduced and improved, due to the simple, easy, and rapid attachment and installation process, as compared to known sidewall assemblies and systems that do not have separate air grille panels and sidewall panels, or that have more complex attachment mechanisms between panels. In addition, the use of air grille panels 22 and sidewall panels 120 made of composite materials reduces the weight and increases the strength of the air grille sidewall panel assembly 12, and provides for a high quality, low cost design.

In addition, disclosed versions of the air grille panel assembly 10 (see FIGS. 1A, 2A), the air grille sidewall panel assembly 12 (see FIGS. 1B, 2B, 3A-3B), the sidewall system 13 (see FIG. 2E), and the method 280 (see FIG. 6) provide air grilles 100 (see FIG. 1A) and cover members 206 (see FIG. 1A), such as baffles 208 (see FIG. 1A), attached to the back of the air grilles 100, where under pressure, the cover members 206, such as the baffles 208, are blown away from the air grilles 100 to allow a specified amount of air flow 266 (see FIG. 1A) to pass between the cabin 150 (see FIG. 1B), such as the passenger cabin 150a (see FIG. 1B), and the underfloor area 272 (see FIG. 1B), or lower fuselage, in a given amount of time. The air grilles 100 and the cover members 206, such as the baffles 208, allow the air flow 266 to pass under a specified pressure, and are also sufficiently robust to withstand wear and tear from passengers or other users. Thus, disclosed versions of the air grille panel assembly 10 (see FIGS. 1A, 2A), the air grille sidewall panel assembly 12 (see FIGS. 1B, 2B, 3A-3B), the sidewall system 13 (see FIG. 2E), and the method 280 (see FIG. 6) may be used for any application of two adjacent chambers where the pressure needs to equalize at a specified pressure threshold.

Moreover, disclosed versions of the air grille panel assembly 10 (see FIGS. 1A, 2A), the air grille sidewall panel assembly 12 (see FIGS. 1B, 2B, 3A-3B), the sidewall system 13 (see FIG. 2E), and the method 280 (see FIG. 6) provide a way to attach or couple interior components in a cabin 150 of a vehicle 14 in a different way than previously done, and provide a standard size air grille panel assembly 10 that may be easily removed and replaced. Thus, part count may be minimized and simplified. Further, disclosed versions of the air grille panel assembly 10 (see FIGS. 1A, 2A), the air grille sidewall panel assembly 12 (see FIGS. 1B, 2B, 3A-3B), the sidewall system 13 (see FIG. 2E), and the method 280 (see FIG. 6) allow for the air grille panel assembly 10 to be integrated with the sidewall panel 120 in an aesthetically pleasing and efficient manner. Moreover, disclosed versions of the air grille panel assembly 10 (see FIGS. 1A, 2A), the air grille sidewall panel assembly 12 (see FIGS. 1B, 2B, 3A-3B), the sidewall system 13 (see FIG. 2E), and the method 280 (see FIG. 6) provide for easy installation and replacement, provide for improved installation time by integrating and incorporating the air grille panel assembly 10 together with the sidewall panel 120, and minimize or eliminate variability in design and installation.

Many modifications and other versions of the disclosure will come to mind to one skilled in the art to which this disclosure pertains having the benefit of the teachings presented in the foregoing descriptions and the associated drawings. The versions described herein are meant to be illustrative and are not intended to be limiting or exhaustive. Although specific terms are employed herein, they are used in a generic and descriptive sense only and not for purposes of limitation.

What is claimed is:

1. An air grille panel assembly for an aircraft, the air grille panel assembly comprising:
an air grille panel comprising a plurality of air grille openings to regulate air flow through the air grille panel, the air grille panel further comprising a top end and a bottom end, the top end configured for coupling to a sidewall panel, the sidewall panel configured for installation in a cabin of the aircraft, and the bottom end configured for coupling to a raceway assembly disposed on a floor in the cabin, the air grill panel further comprising,
a top end attachment portion having a row of vertical slot openings configured to interface with a row of stud elements fixed to a back side of the sidewall panel, each stud element having a projection portion, with a substantially constant diameter, projecting from the stud element, wherein each projection portion is configured for insertion first through each vertical slot opening in the air grille panel, then through a central through hole of a keeper element of a nut keeper assembly, and then through a through opening of a nut element of the nut keeper assembly, such that the nut element is coupled to and at an outermost end of the projection portion in an installed position, and
a bottom end attachment portion comprising a plurality of attachment openings and a plurality of notched openings formed through the bottom end attachment portion, a plurality of fin portions, and a plurality of air flow passages formed between the fin portions;
a frame member disposed around a perimeter of each of the plurality of air grille openings, to define each of the plurality of air grille openings;
an air grille coupled to the frame member and covering each of the plurality of air grille openings; and
a cover member releasably attached to a back side of the air grille and configured to move between a closed position and an open position,
wherein the air grill panel assembly is configured for coupling to the sidewall panel, via a float attachment, that allows for a vertical adjustment, to accommodate different installed positions of the air grille panel assembly in the cabin of the aircraft.

2. The air grille panel assembly of claim 1, wherein the air grille panel comprises two air grille openings, each having a size and a shape that are identical, and each having the frame member, the air grille, and the cover member.

3. The air grille panel assembly of claim 1, wherein the bottom end attachment portion is configured to couple, with a plurality of fasteners in a fastener clamp-on attachment, to a floor sill flange of a raceway assembly, to create an interface between a back side of the bottom end attachment portion and an interior side of the floor sill flange.

4. The air grille panel assembly of claim 1, wherein the frame member has curved corners and a rectangular shape.

5. The air grille panel assembly of claim 1, wherein the air grille comprises a plurality of horizontal louvers oriented in a perpendicular arrangement to a plurality of vertical rib members.

6. The air grille panel assembly of claim 1, wherein the cover member comprises a baffle that is flexible and moves to the open position upon occurrence of a decompression event in the aircraft.

7. An air grille sidewall panel assembly for an aircraft, the air grille sidewall panel assembly comprising:
a sidewall panel comprising a top end portion and a bottom end portion, the sidewall panel having a unitary configuration;
an air grille panel assembly coupled to the sidewall panel, the air grille panel assembly comprising:
an air grille panel comprising a plurality of air grille openings to regulate air flow through the air grille panel, the air grille panel further comprising a top end with a top end attachment portion having a plurality of vertical slot openings, and a bottom end configured for coupling to a raceway assembly disposed on a floor in a cabin of the vehicle aircraft, the bottom end having a bottom end attachment portion comprising a plurality of attachment openings and a plurality of notched openings formed through the bottom end attachment portion, a plurality of fin portions, and a plurality of air flow passages formed between the fin portions;
a frame member having curved corners and extending around a perimeter of each of the plurality of air grille openings, to define each of the plurality of air grille openings;
an air grille coupled to the frame member and covering each of the plurality of air grille openings; and
a cover member releasably attached to a back side of the air grille and configured to move between a closed position and an open position; and
a plurality of interface attachment assemblies coupling the top end attachment portion of the air grille panel, in a float attachment, to the bottom end portion of the sidewall panel, each interface attachment assembly comprising a stud element fixed to a back side of the sidewall panel, the stud element having a projection portion, with a substantially constant diameter, projecting from the stud element, and each interface attachment assembly further comprising a nut keeper assembly having a keeper element and a nut element, wherein each projection portion is inserted first through each vertical slot opening in the air grille panel, then through a central through hole of the keeper element, and then through a through opening of the nut element, such that the nut element is coupled to and at an outermost end of the projection portion in an installed position,
wherein the float attachment of the sidewall panel to the air grill panel assembly allows for a vertical adjustment, to accommodate different installed positions of the air grille sidewall panel assembly in the cabin of the vehicle aircraft.

8. The air grille sidewall panel assembly of claim 7, wherein the sidewall panel further comprises attachment fittings disposed at the top end portion of the sidewall panel, the attachment fittings configured to attach to a stowage bin in the cabin of the aircraft.

9. The air grille sidewall panel assembly of claim 7, wherein the air grille panel comprises two air grille openings, each having a size and a shape that are identical, and each having the frame member, the air grille, and the cover member.

10. The air grille sidewall panel assembly of claim 7, wherein the bottom end attachment portion is coupled with a plurality of fasteners in a fastener clamp-on attachment, to a floor sill flange of the raceway assembly, to create an interface between a back side of the bottom end attachment portion and an interior side of the floor sill flange.

11. An aircraft comprising:
a sidewall system in a cabin of the aircraft, the sidewall system comprising:

an air grille sidewall panel assembly comprising:
    a sidewall panel comprising a top end portion and a bottom end portion, the sidewall panel having a unitary configuration;
    an air grille panel assembly coupled to the sidewall panel, the air grille panel assembly comprising:
        an air grille panel comprising a plurality of air grille openings to regulate air flow through the air grille panel, the air grille panel further comprising a top end with a top end attachment portion having a plurality of vertical slot openings, and further comprising a bottom end with a bottom end attachment portion comprising a plurality of attachment openings and a plurality of notched openings formed through the bottom end attachment portion, a plurality of fin portions, and a plurality of air flow passages formed between the fin portions;
        a frame member having curved corners and extending around a perimeter of each of the plurality of air grille openings, to define each of the plurality of air grille openings;
        an air grille coupled to the frame member and covering each of the plurality of air grille openings; and
        a baffle releasably attached to a back side of the air grille and configured to move between a closed position and an open position; and
    a plurality of interface attachment assemblies coupling the top end attachment portion of the air grille panel, in a float attachment, to the bottom end portion of the sidewall panel, each interface attachment assembly comprising a stud element fixed to a back side of the sidewall panel, the stud element having a projection portion, with a substantially constant diameter, projecting from the stud element, and each interface attachment assembly further comprising a nut keeper assembly having a keeper element and a nut element, wherein each projection portion is inserted first through each vertical slot opening on the air grille panel, then through a central through hole of the keeper element, and then through a through opening of the nut element, such that the nut element is coupled to and at an outermost end of the projection portion in an installed position;
    a raceway assembly comprising a raceway with a first flange member and a second flange member, and a raceway cover removably coupled to the raceway, the raceway assembly disposed on a floor in the cabin of the aircraft; and
    a plurality of attachment elements coupling the bottom end attachment portion of the air grille panel, in a removable attachment, to the first flange member of the raceway assembly,
  wherein the float attachment of the sidewall panel to the air grill panel assembly allows for a vertical adjustment to accommodate different installed positions of the air grille sidewall panel assembly in the cabin of the aircraft.

12. The aircraft of claim 11, wherein the aircraft further comprises a stowage bin in the cabin of the aircraft, and the sidewall panel further comprises attachment fittings disposed at the top end portion of the sidewall panel, the attachment fittings attaching the sidewall panel to the stowage bin.

13. The aircraft of claim 11, wherein the air grille panel comprises two air grille openings, each having a size and a shape that are identical, and each having the frame member, the air grille, and the baffle.

14. The aircraft of claim 11, the plurality of attachment elements coupling the bottom end attachment portion to the air grille panel comprise a plurality of fasteners, and the first flange member of the raceway assembly comprises a floor sill flange, and wherein the bottom end attachment portion coupled with the plurality of fasteners to the floor sill flange creates an interface between a back side of the bottom end attachment portion and an interior side of the floor sill flange.

15. A method of installing an air grille sidewall panel assembly in an aircraft, the method comprising the steps of:
    providing an air grille panel assembly comprising:
        an air grille panel comprising a top end, a bottom end, and a plurality of air grille openings, the top end having a top end attachment portion with a plurality of vertical slot openings, and the bottom end having a bottom end attachment portion comprising a plurality of attachment openings and a plurality of notched openings formed through the bottom end attachment portion, a plurality of fin portions, and a plurality of air flow passages formed between the fin portions;
        a frame member disposed around a perimeter of each of the plurality of air grille openings, to define each of the plurality of air grille openings;
        an air grille coupled to the frame member and covering each of the plurality of air grille openings; and
        a cover member releasably attached to a back side of the air grille and configured to move between a closed position and an open position;
    providing a sidewall panel comprising a top end portion and a bottom end portion;
    coupling, with a plurality of interface attachment assemblies, the top end of the air grille panel to the bottom end portion of the sidewall panel, to obtain the air grille sidewall panel assembly in a float attachment, wherein each interface attachment assembly comprises a stud element fixed to a back side of the sidewall panel, the stud element having a projection portion, with a substantially constant diameter, projecting from the stud element, and each interface attachment assembly further comprises a nut keeper assembly having a keeper element and a nut element, and wherein each projection portion is inserted first through each vertical slot opening on the air grille panel, then through a central through hole of the keeper element, and then through a through opening of the nut element, such that the nut element is coupled to and at an outermost end of the projection portion in an installed position; and
    installing the air grille sidewall panel assembly in a cabin of the aircraft, by coupling the top end portion of the sidewall panel to an aircraft structure disposed near a ceiling in the cabin, and coupling the bottom end of the air grille panel to a raceway assembly disposed on a floor in the cabin,
  wherein the float attachment of the air grille sidewall panel assembly allows for a vertical adjustment to accommodate different installed positions of the air grille sidewall panel assembly in the cabin of the aircraft.

16. The method of claim 15, wherein providing the air grille panel assembly further comprises providing the air grille panel assembly comprising the air grille panel comprising two air grille openings, each having a size and a shape that are identical, and each having the frame member, the air grille, and the cover member.

17. The method of claim 15, wherein providing the air grille panel assembly further comprises providing the air grille panel assembly comprising the air grille panel comprising the bottom end attachment portion coupled with a plurality of fasteners in a fastener clamp-on attachment, to a floor sill flange of the raceway assembly, to create an interface between a back side of the bottom end attachment portion and an interior side of the floor sill flange.

18. The method of claim 15, wherein providing the air grille panel assembly further comprises providing the air grille panel assembly comprising the frame member having curved corners and a rectangular shape.

19. The method of claim 15, wherein coupling, with the plurality of interface attachment assemblies, further comprises coupling the air grille panel to the sidewall panel with six (6) interface attachment assemblies.

20. The method of claim 15, wherein installing the air grille sidewall panel assembly further comprises installing the air grille sidewall panel assembly, by coupling attachment fittings disposed at the top end portion of the sidewall panel to the aircraft structure comprising a stowage bin disposed near the ceiling in the cabin.

21. The air grille sidewall panel assembly of claim 7, wherein the air grille panel is made of a composite material, including one of, a carbon fiber reinforced plastic, or a composite sandwich panel with a honeycomb core.

22. The air grille sidewall panel assembly of claim 7, wherein the air grille comprises a plurality of horizontal louvers oriented in a perpendicular arrangement to a plurality of vertical rib members.

23. The air grille sidewall panel assembly of claim 7, wherein the cover member comprises a baffle that is flexible and moves to the open position upon occurrence of a decompression event in the vehicle aircraft.

24. The air grille sidewall panel assembly of claim 7, wherein the air grille panel assembly comprises two cover members, including a first cover member and a second cover member, that are identical in size and shape.

25. An air grille sidewall panel assembly installed in an aircraft, the air grille sidewall panel assembly comprising:
    a sidewall panel comprising a top end portion and a bottom end portion, the sidewall panel having a unitary configuration and a curved profile;
    an air grille panel assembly coupled to the sidewall panel, the air grille panel assembly comprising:
        an air grille panel comprising a plurality of air grille openings to regulate air flow through the air grille panel, the air grille panel further comprising a top end with a top end attachment portion having a plurality of vertical slot openings, and a bottom end coupled to a raceway assembly disposed on a floor in a passenger cabin of the aircraft, the bottom end having a bottom end attachment portion comprising a plurality of attachment openings and a plurality of notched openings formed through the bottom end attachment portion, a plurality of fin portions, and a plurality of air flow passages formed between the fin portions;
        a frame member having curved corners and extending around a perimeter of each of the plurality of air grille openings, to define each of the plurality of air grille openings;
        an air grille coupled to the frame member and covering each of the plurality of air grille openings; and
        a cover member releasably attached to a back side of the air grille and disposed over substantially all of the back side of the air grille, the cover member configured to move between a closed position and an open position; and
    a plurality of interface attachment assemblies coupling the top end attachment portion of the air grille panel, in a float attachment, to the bottom end portion of the sidewall panel, each interface attachment assembly comprising a stud element fixed to a back side of the sidewall panel, the stud element having a projection portion, with a substantially constant diameter, projecting from the stud element, and each interface attachment assembly further comprising a nut keeper assembly having a keeper element and a nut element, wherein each projection portion is inserted first through each vertical slot opening on the air grille panel, then through a central through hole of the keeper element, and then through a through opening of the nut element, such that the nut element is coupled to and at an outermost end of the projection portion in an installed position,
    wherein the float attachment of the sidewall panel to the air grill panel assembly allows for a vertical adjustment, to accommodate different installed positions of the air grille sidewall panel assembly in the passenger cabin of the aircraft.

26. The air grille sidewall panel assembly of claim 25, wherein the sidewall panel has attachment fittings located at a top end portion of the sidewall panel, the attachment fittings attaching the sidewall panel to a stowage bin of the aircraft.

27. The air grille sidewall panel assembly of claim 25, wherein the air grille is designed to allow for return air flow passage without conditioned air migration into the passenger cabin, and is designed to allow for rapid flow of air in a decompression event where there is a sudden pressure differential.

28. The air grille sidewall panel assembly of claim 25, wherein the cover member is made of a sound attenuating material that provides a barrier to minimize engine and fuselage noise of the aircraft.

\* \* \* \* \*